(12) United States Patent
Jo et al.

(10) Patent No.: US 11,567,879 B2
(45) Date of Patent: Jan. 31, 2023

(54) METHOD OF ENCRYPTING DATA IN NONVOLATILE MEMORY DEVICE, NONVOLATILE MEMORY DEVICE AND USER DEVICE

(71) Applicant: SAMSUNG ELECTRONICS CO., LTD., Suwon-si (KR)

(72) Inventors: Youngmin Jo, Hwaseong-si (KR); Daeseok Byeon, Seongnam-si (KR); Kisung Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 237 days.

(21) Appl. No.: 17/118,091

(22) Filed: Dec. 10, 2020

(65) Prior Publication Data
US 2021/0365388 A1 Nov. 25, 2021

(30) Foreign Application Priority Data
May 25, 2020 (KR) .................. 10-2020-0062047

(51) Int. Cl.
*G06F 12/14* (2006.01)
*G06F 21/72* (2013.01)
*G06F 21/79* (2013.01)
*G06F 21/85* (2013.01)
*H04L 9/06* (2006.01)
*G06F 21/74* (2013.01)

(52) U.S. Cl.
CPC .......... *G06F 12/1408* (2013.01); *G06F 21/72* (2013.01); *G06F 21/74* (2013.01); *G06F 21/79* (2013.01); *G06F 21/85* (2013.01); *H04L 9/06* (2013.01); *G06F 2212/1052* (2013.01); *H04L 2209/08* (2013.01)

(58) Field of Classification Search
CPC ...... G06F 12/1408; G06F 21/72; G06F 21/74; G06F 21/79; G06F 21/85; G06F 2212/1052; H04L 9/06; H04L 2209/08
See application file for complete search history.

(56) References Cited

U.S. PATENT DOCUMENTS

| | | | |
|---|---|---|---|
| 6,337,808 B1* | 1/2002 | Forbes | G11C 7/062 365/205 |
| 7,370,192 B2 | 5/2008 | Sumner | |
| 8,130,955 B2 | 3/2012 | Trichina et al. | |
| 8,976,586 B2 | 3/2015 | Nagai et al. | |
| 9,218,159 B2 | 12/2015 | Seol et al. | |

(Continued)

FOREIGN PATENT DOCUMENTS

JP 20120034268 A 2/2012

*Primary Examiner* — Ayoub Alata
(74) *Attorney, Agent, or Firm* — Volentine, Whitt & Francos, PLLC

(57) ABSTRACT

A method of encrypting data in a nonvolatile memory device (NVM) includes; programming data in selected memory cells, sensing the selected memory cells at a first time during a develop period to provide random data, sensing the selected memory cells at a second time during the develop period to provide main data, encrypting the main data using the random data to generate encrypted main data, and outputting the encrypted main data to an external circuit, wherein the randomness of the random data is based on a threshold voltage distribution of the selected memory cells.

20 Claims, 24 Drawing Sheets

(56) References Cited

U.S. PATENT DOCUMENTS

| | | |
|---|---|---|
| 9,465,584 B2 | 10/2016 | Lin et al. |
| 9,966,146 B2 | 5/2018 | Watanabe et al. |
| 9,971,566 B2 | 5/2018 | Cambou |
| 10,534,554 B2 | 1/2020 | Tran et al. |
| 2014/0037086 A1* | 2/2014 | Seol ............... H04L 9/0869 |
| | | 708/250 |
| 2014/0047246 A1* | 2/2014 | Seol ............... G06F 12/1408 |
| | | 713/193 |
| 2019/0182054 A1* | 6/2019 | Leobandung ........ H04L 9/3278 |

* cited by examiner

471a

471b

| CELL | SEN1 | SEN2 | ENDTA |
|------|------|------|-------|
| #1   | 0    | 1    | 0XOR1 |
| #2   | 1    | 1    | 1XOR1 |

METHOD OF ENCRYPTING DATA IN NONVOLATILE MEMORY DEVICE, NONVOLATILE MEMORY DEVICE AND USER DEVICE

CROSS-REFERENCE TO RELATED APPLICATION

This U.S. application claims priority under 35 USC § 119 to Korean Patent Application No. 10-2020-0062047 filed on May 25, 2020 in the Korean Intellectual Property Office (KIPO), the subject matter of which is hereby incorporated by reference.

BACKGROUND

1. Technical Field

The inventive concept relate generally to memory devices, and more particularly to methods of encrypting data in nonvolatile memory devices, nonvolatile memory devices operating the same and user devices including the nonvolatile memory devices

2. Discussion of the Related Art

A semiconductor memory device is a storage device which is fabricated with semiconductors such as, but not limited to, silicon (Si), germanium (Ge), gallium arsenide (GaAs), and indium phosphide (InP). Semiconductor memory devices may be classified into a volatile memory and a nonvolatile memory depending on data retention characteristics of the memory devices upon being cut off from power supply.

The volatile memory may lose stored data when power is interrupted. However, the nonvolatile memory retains stored data even in the absence of applied power.

Flash memory is one type of nonvolatile memory and enjoys advantages including mass storage capability, relatively high noise immunity and low power consumption.

Flash memory may be used to store data that has been encrypted using an encryption key. The encryption key may be generated from user information, codes, random data or some combination of the same. Some memory systems including the flash memory also include a separate random number generator used to generate the random data subsequently used to encrypt main data.

SUMMARY

Embodiment of the inventive concept variously provide a method of encrypting data in a nonvolatile memory device without necessarily using a separate random number generator; a nonvolatile memory device capable of encrypting data without using a separate random number generator; and a nonvolatile memory device capable of generating encrypted main data using internally-generated random data having randomness based on a threshold voltage distribution of memory cells in the nonvolatile memory.

In one embodiment, a method of encrypting data in a nonvolatile memory device (NVM) is provided, wherein the NVM includes a memory cell array of memory cells respectively configured to store at least one data bit. The method includes; programming data in selected memory cells among the memory cells, sensing the selected memory cells at a first time during a develop period to provide random data, and sensing the selected memory cells at a second time during the develop period to provide main data, encrypting the main data using the random data to generate encrypted main data; and outputting the encrypted main data to an external circuit, wherein randomness of the random data is based on a threshold voltage distribution of the selected memory cells.

In another embodiment, a nonvolatile memory device (NVM) includes; a memory cell array including pages and each of the pages including memory cells respectively configured to store at least one data bit, a page buffer circuit coupled to the memory cell array through bitlines, the page buffer circuit including page buffers respectively configured to sense memory cells in a selected page among the pages at a first time and at a second time during a develop period through the bitlines to provide random data and main data, respectively, an encryption circuit connected to the page buffer circuit and configured to encrypt the main data using the random data to generate encrypted main data, a data input/output (I/O) circuit connected to the encryption circuit and configured to output the encrypted main data to an external circuit, and a control circuit configured to control the page buffer circuit, the encryption circuit and the data I/O circuit, wherein the randomness of the random data is based on a threshold voltage distribution of the selected memory cells.

In another embodiment, a user device includes; a secure element configured to store secure data, a memory configured to store user data, and a processor connected to the secure element and the memory through a bus, wherein the processor is configured to form a first security session between the user device and an external device while the user device operates in a secure mode, the first security session being formed by performing a handshaking operation between the user device and the external device, form a second security session between the user device and the external device while the user device operates in a normal mode, the second security session being formed without performing the handshaking operation and by loading the session information stored in the secure element, and provide encrypted data from the memory through the second security session based on the master key stored in the secure element, wherein the memory is configured to encrypt the user data using a physical characteristic of memory cells storing the user data.

BRIEF DESCRIPTION OF THE DRAWINGS

Certain embodiments of the inventive concept will be described hereafter with reference to the accompanying drawings.

DETAILED DESCRIPTION

Certain embodiments of the inventive concept will now be described in some additional detail with reference to the accompanying drawings.

Figure 1:
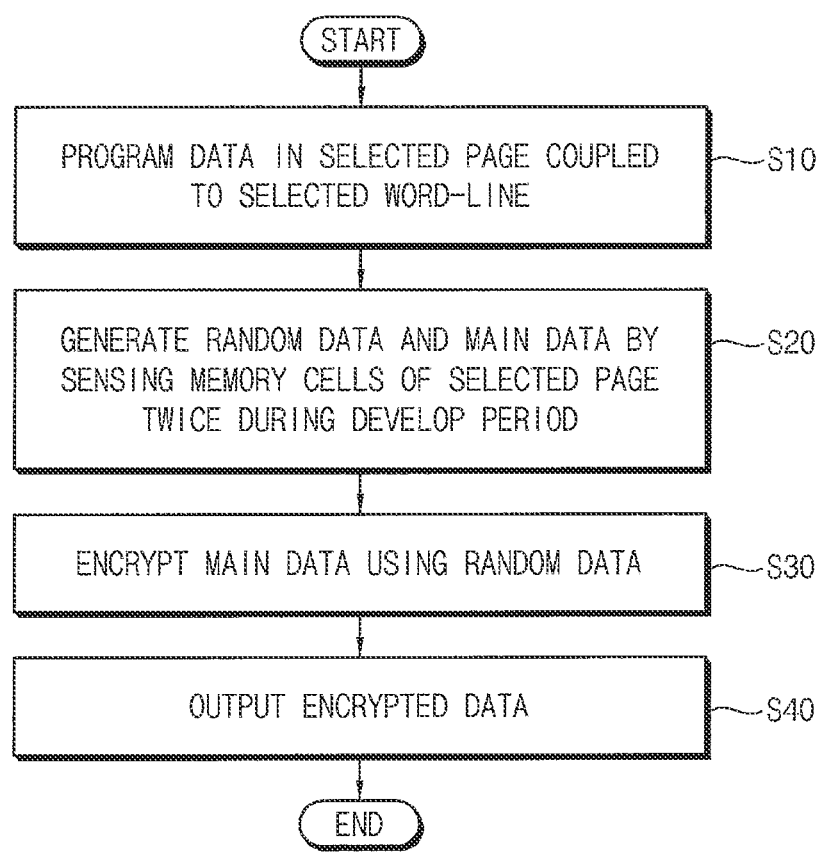
FIG. 1 is a flowchart summarizing in one example a method of encrypting data in a nonvolatile memory device according to embodiments of the inventive concept.

FIG. 1 is a flow chart summarizing in one example a method of encrypting data in a nonvolatile memory device (NVM) according to embodiments of the inventive concept.

The NVM may include a memory cell array arranged in pages variously coupled to wordlines, each page including memory cells, and each memory cell configured to store at least one data bit.

Referring to FIG. 1, data is programmed in selected memory cells of a selected page from among the pages (S10). Each of the memory cells may be configured as a single-level memory cell storing a single data bit, or as a multi-level memory cell storing two or more data nits. using corresponding threshold voltage distributions.

The selected memory cells may then be respectively sensed at a first time and at a second time during a develop period—using at least one page buffer circuit variously coupled to the memory cell array through bitlines—in order to obtain random data and main data (S20). In some embodiments, the random data and the main data may be obtained by performing a double sampling on the selected memory cells at the first time and at the second time while a first read voltage is applied to a selected wordline. In this regard, the random data may be randomized in relation to one or more threshold voltage distribution(s) of the selected memory cells.

Thus, the selected memory cells of the selected page may be first sensed (e.g., a first sensing operation) at the first time, such that the random data is loaded (or stored) in page buffer(s) of the page buffer circuit, and the selected memory cells of the selected page may again be sensed (e.g., a second sensing operation) at a second time, such that the main data is stored in the page buffer(s). In some embodiments, the random data may be stored in a first data latch in each of the page buffer(s) through a sensing latch in each of the page buffer(s), and the main data may be stored in a second data latch in each of the page buffer(s) through the sensing latch.

Here, the order of the first time and the second time may vary, but each of the first time and the second time may occur during a defined develop period. In some embodiments, the second time may be closer to an end time of the develop period than a beginning time for the develop period.

The main data may now be encoded in relation to the random data using an encryption circuit connected to the page buffer circuit (S30). In some embodiments, the encryption circuit may perform one or more logical operation(s) on the main data and the random data in order to generate encrypted main data. The logical operation(s) may include, for example, an exclusive OR operation and/or an exclusive NOR operation performed between the main data and the random data.

A data input/output (I/O) circuit connected to the page buffer circuit may be used to output the encrypted main data to an external circuit (i.e., an electrically connected point outside of the NVM) (S40).

In this manner, for example, a method of encrypting data in a NVM may use random data internally generated using one or more physical characteristic of the constituent memory cells (e.g., one or more threshold voltage distributions) to encrypt main data, thereby generating encrypted main data that may be provided to an external circuit. Accordingly, the random data may be generated without requirement of (an additional or a specialized) random number generating circuit. This result reduces overall cost and also removes a potentially vulnerable point of attack (i.e., the random number generating circuit) for data being processed by the NVM.

Figure 2:
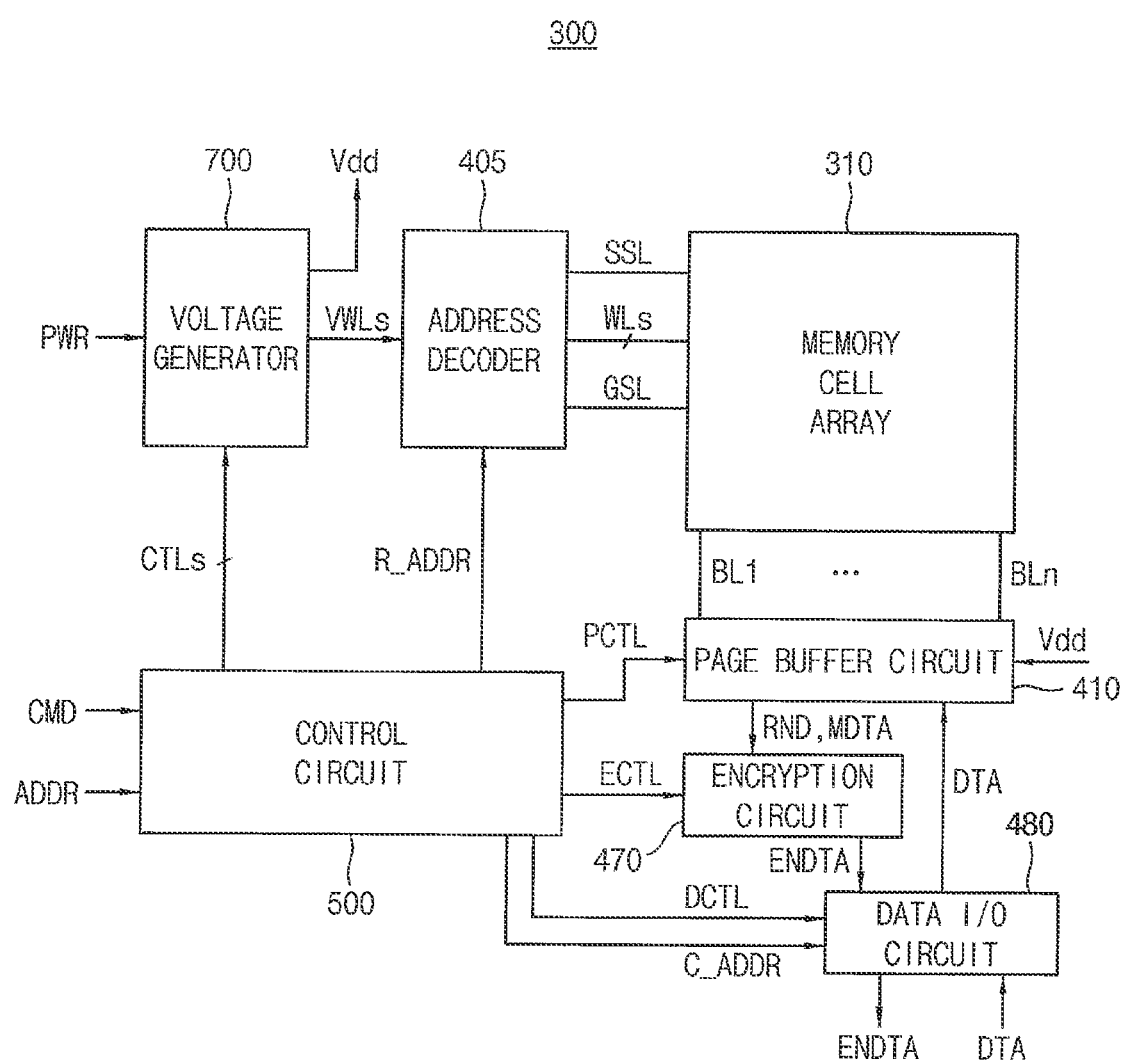
FIG. 2 is a block diagram illustrating a nonvolatile memory device according to embodiments of the inventive concept.

FIG. 2 is a block diagram illustrating in one example a nonvolatile memory device (NVM) 300 according to embodiments of the inventive concept.

Figure 3:
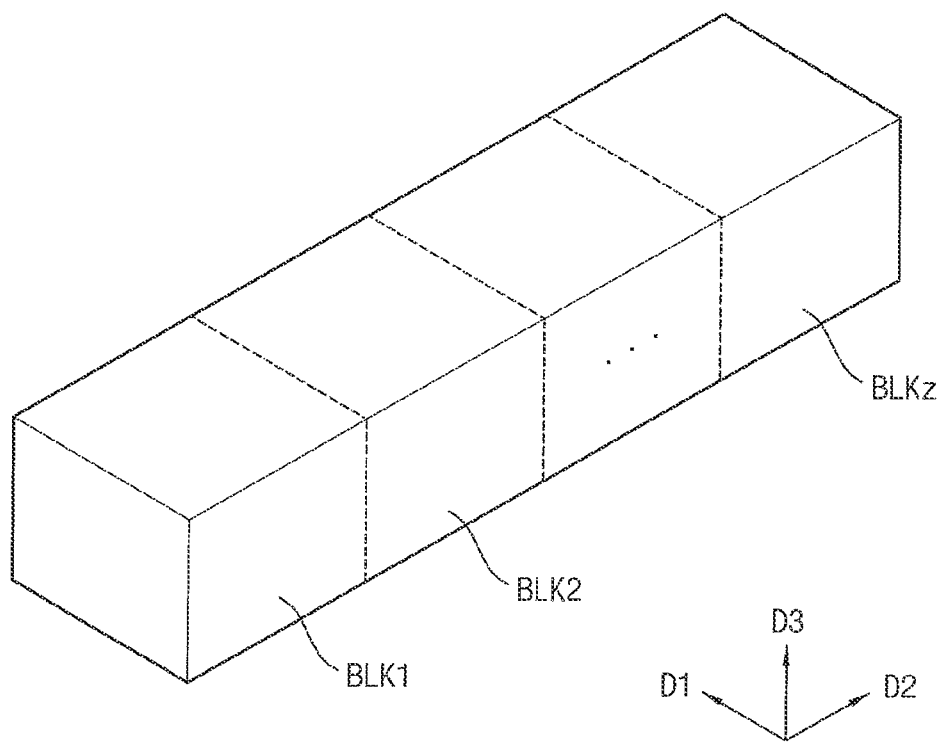
FIG. 3 is a conceptual diagram further illustrating in one example the memory blocks described in relation to FIG. 2.

Referring to FIG. 3, the NVM 300 includes a memory cell array 310, an address decoder 405, a page buffer circuit 410, an encryption circuit 470, a data input/output (I/O) circuit 480, a control circuit 500 and a voltage generator 700.

The memory cell array 310 may be coupled to the address decoder 405 through a string selection line SSL, wordlines WLs, and a ground selection line GSL. In addition, the memory cell array 310 may be coupled to the page buffer circuit 410 through bitlines BL1~BLn, where 'n' is a natural number greater than two. The memory cell array 310 may include memory cells variously coupled between the wordlines WLs and bitlines BL1~BLn.

In some embodiments, the memory cell array 310 may be physically configured as a three-dimensional (3D) (or vertical) memory cell array on one or more substrate(s). In this case, the memory cell array 310 may include vertical cell strings oriented such that at least one memory cell is located above another memory cell. In other embodiments, the memory cell array 310 may be physically configured as a two-dimensional (2D) memory cell array having a substantially planar structure.

FIG. 3 is a conceptual diagram further illustrating in one example memory blocks of the memory cell array 310 of FIG. 2.

Referring to FIG. 2, the memory cell array 310 may include memory blocks BLK1 to BLKz, where 'z' is a natural number greater than two, which extend along first, second and third directions D1, D2 and D3.

In some embodiments, each of the memory blocks BLK1 to BLKz (as well as constituent memory cells and/or pages) may be selected by the address decoder 405 of FIG. 2. That is, the address decoder 405 may select a memory block BLK corresponding to a block address among the memory blocks BLK1 to BLKz.

Figure 4:
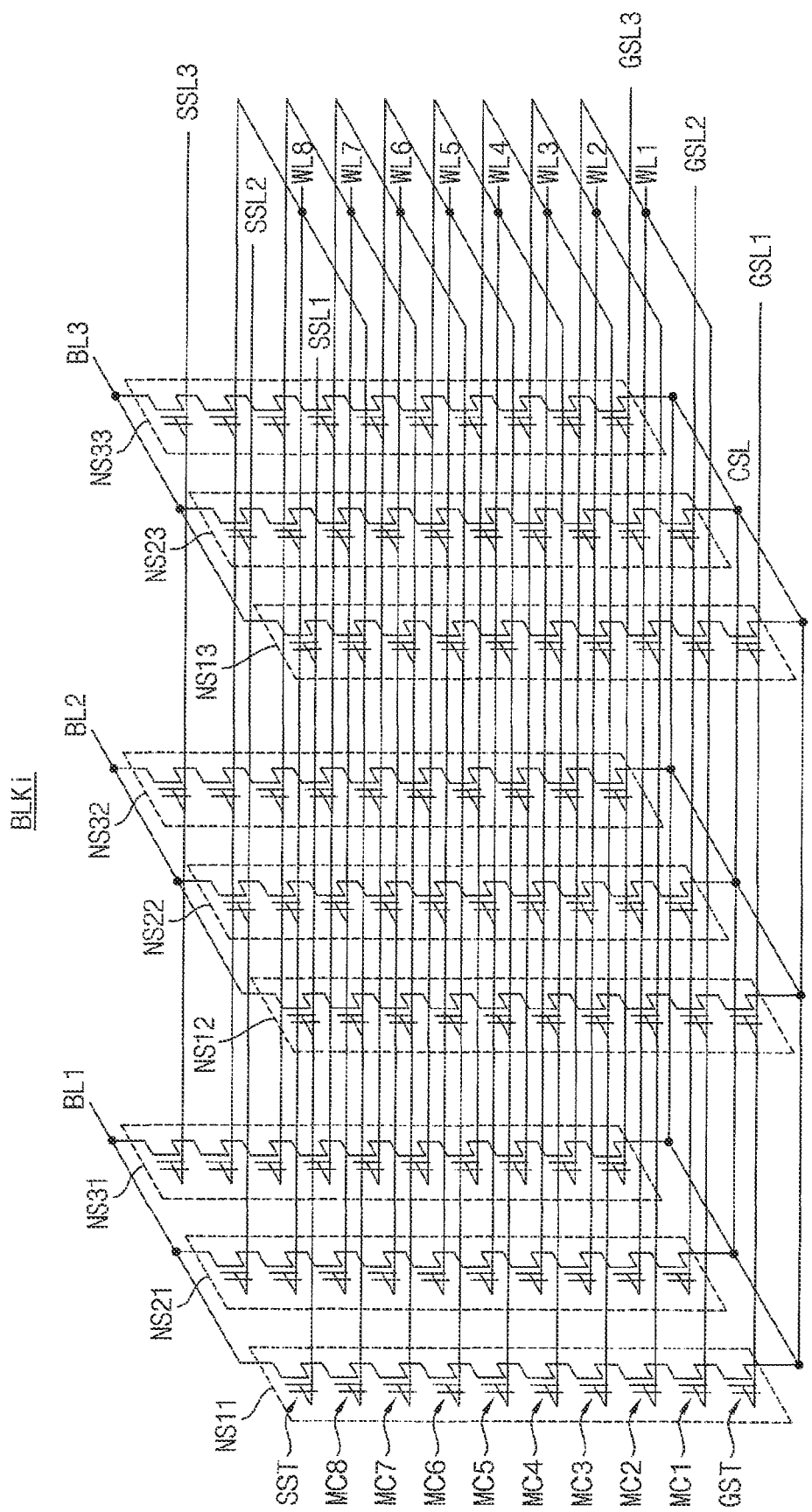
FIG. 4 is a partial circuit diagram further illustrating in relevant portion a memory block, as described in relation to FIGS. 2 and 3.

FIG. 4 is a partial circuit diagram further illustrating in relevant portion one of the memory blocks BLKi of FIG. 3.

The memory block BLKi of FIG. 4 may be formed on a substrate in a three-dimensional structure (or a vertical structure). For example, memory cell strings included in the memory block BLKi may be formed in a direction perpendicular to the substrate.

Figure 5:
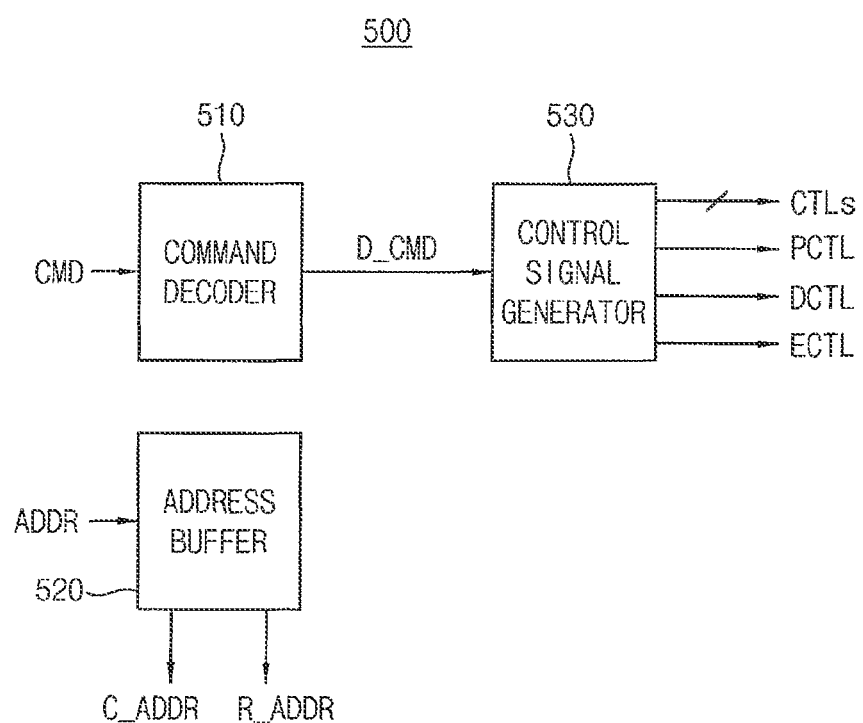
FIG. 5 is a block diagram further illustrating in one example the control circuit 500 of FIG. 2.

Referring to FIG. 4, a memory block BLKi may include memory cell strings NS11 to NS33 coupled between bitlines BL1, BL2 and BL3 and a common source line CSL. Each of the memory cell strings NS11 to NS33 may include a string selection transistor SST, memory cells MC1 to MC8, and a ground selection transistor GST. In FIG. 5, each of the memory cell strings NS11 to NS33 is illustrated to include eight memory cells MC1 to MC8. However, embodiments are not limited thereto. In some embodiments, each of the memory cell strings NS11 to NS33 may include any number of memory cells.

The string selection transistor SST may be connected to corresponding string selection lines SSL1 to SSL3. The memory cells MC1 to MC8 may be connected to corresponding wordlines WL1 to WL8, respectively. The ground selection transistor GST may be connected to corresponding ground selection lines GSL1 to GSL3. The string selection transistor SST may be connected to corresponding bitlines BL1, BL2 and BL3, and the ground selection transistor GST may be connected to the common source line CSL.

Wordlines (e.g., WL1) having the same height may be commonly connected, and the ground selection lines GSL1 to GSL3 and the string selection lines SSL1 to SSL3 may be separated.

Referring to FIG. 2, the control circuit 500 may receive a command (signal) CMD and an address (signal) ADDR from the memory controller 100 and control an erase loop, a program loop and a read operation of the NVM 200 based on the command signal CMD and the address signal ADDR. The program loop may include a program operation and a program verification operation. The erase loop may include an erase operation and an erase verification operation.

For example, the control circuit 500 may generate control signals CTLs to control the voltage generator 700, may generate a page buffer control signal PCTL to control the page buffer circuit 410, may generate a control signal ECTL to control the encryption circuit 470, and may generate a control signal DCTL to control the data I/O circuit 480 based on the command signal CMD. The control circuit 500 may provide the control signals CTLs to the voltage generator 700, provide the page buffer control signal PCTL to the page buffer circuit 410, provide the control signal ECTL to the encryption circuit 470 and provide the control signal DCTL to the data I/O circuit 480.

The control circuit 500 may generate a row address R_ADDR and a column address C_ADDR based on the address signal ADDR. The control circuit 500 may provide the row address R_ADDR to the address decoder 405 and provide the column address C_ADDR to the data input/output circuit 480.

The address decoder 405 may be coupled to the memory cell array 310 through the string selection line SSL, the wordlines WLs, and the ground selection line GSL. During the program operation or the read operation, the address decoder 405 may determine one of the wordlines WLs as a selected wordline and determine rest of the wordlines WLs (excepting the selected wordline) as unselected wordlines based on the row address R_ADDR.

The voltage generator 700 may generate a voltage Vdd and wordline voltages VWLs, which are required for the operation of the NVM 300, based on the control signals CTLs. The voltage generator 700 may receive a power PWR from an external memory controller. The wordline voltages VWLs may be applied to the wordlines WLs through the address decoder 405, and the voltage Vdd may be applied to the page buffer circuit 410.

For example, during the erase operation, the voltage generator 700 may apply an erase voltage to a well of the memory block and may apply a ground voltage to entire wordlines of the memory block. During the erase verification operation, the voltage generator 700 may apply an erase verification voltage to the entire wordlines of the memory block or sequentially apply the erase verification voltage to wordlines in a wordline basis. For example, during the program operation, the voltage generator 700 may apply a program voltage to the selected wordline and may apply a program pass voltage to the unselected wordlines. In addition, during the program verification operation, the voltage generator 700 may apply a program verification voltage to the selected wordline and may apply a verification pass voltage to the unselected wordlines. In addition, during the read operation, the voltage generator 700 may apply a default read voltage and an offset read voltage to the selected wordline and may apply a read pass voltage to the unselected wordlines.

The page buffer circuit 410 may be coupled to the memory cell array 300 through the bitlines BL1~BLn. The page buffer circuit 410 may include multiple page buffers. The page buffer circuit 410 may temporarily store data to be programmed in a selected page or data read out from the selected page.

In some embodiments, each of the page buffers may include two latches, wherein the page buffers may be used to sense memory cells of a selected page twice at a first time and at a second time during a develop period through the bitlines BL1~BLn in order to store both random data RND and main data MDTA. Thereafter, the random data RND and the main data MDTA may be used by the encryption circuit 470 to generate encrypted main data ENDTA. Here, the "random" nature of the random data RND may be determined by one or more physical attributes of memory cells in the NVM, such as one or more threshold voltage distributions of certain memory cells (e.g., the selected memory cells).

Thus, the encryption circuit 470 may receive the random data RND and the main data MDTA from the page buffer circuit 410, encrypt the main data MDTA using the random data RND, and thereafter provide encrypted random data ENDTA to the data I/O circuit 480.

The data I/O circuit 480 may be coupled to the page buffer circuit 410 and the encryption circuit 470. During execution of a program operation, the data I/O circuit 480 may receive externally provided program data DTA and provide the program data DTA to the page buffer circuit 410 in response to the column address C_ADDR received from the control circuit 500. During execution of a read operation, the data I/O circuit 480 may receive the encrypted data ENDTA from the encryption circuit 470 in response to the column address C_ADDR received from the control circuit 500 and thereafter provide the encrypted data ENDTA to an external device.

Thus, in certain embodiments, the NVM 300 may (1) generate random data RND by sensing selected memory cells at a first time during a develop period using (or in accordance with) threshold voltage distribution(s) of selected memory cells in the memory cell array 310; (2) obtain main data MDTA by normally sensing selected memory cells at a second time during the develop period; (3) encrypting the main data MDTA using the internally-generated random data RND to generate encrypted main data ENDTA; and (4) output the encrypted data ENDTA to an external circuit.

FIG. 5 is a block diagram further illustrating in one example the control circuit 500 of FIG. 2 according to embodiments of the inventive concept.

Referring to FIG. 5, the control circuit 500 may include a command decoder 510, an address buffer 520 and a control signal generator 530.

The command decoder 510 may be used to decode one or more command(s) CMD in order to provide one or more decoded command(s) D_CMD to the control signal generator 530. The address buffer 520 may receive one or more address signal(s) ADDR, and thereafter provide a row address R_ADDR to the address decoder 405 and a column address C_ADDR to the data I/O circuit 820.

Upon receiving the decoded command(s) D_CMD, the control signal generator 530 may generate various control signal(s) CTLs (e.g., a page buffer control signal PCTL, a data I/O circuit control signal DCTL, an encryption circuit control signal ECTL, etc.) in response to the decoded command(s) D_CMD. Thereafter, the various control signals may be distributed to other components of the NVM 300 (e.g., the page buffer circuit 410, the data I/O circuit 480 and the encryption circuit 470).

Figure 6:
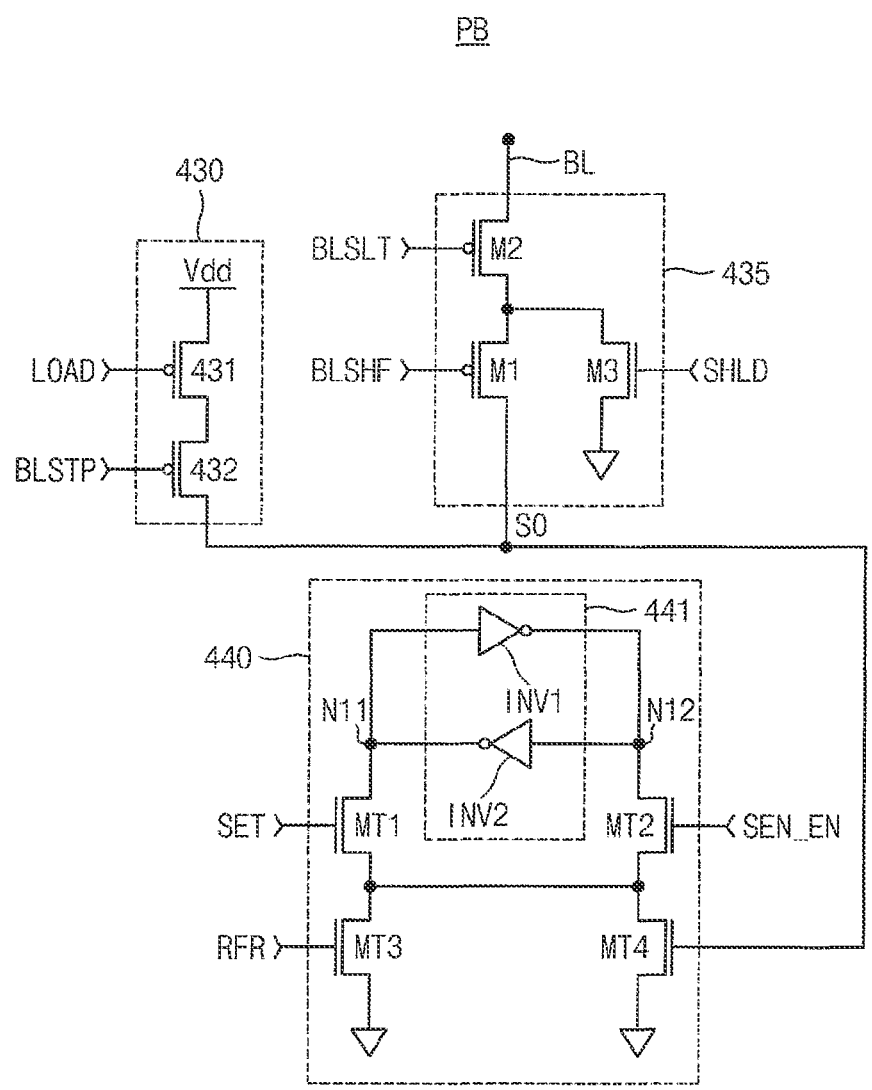
FIG. 6 is a circuit diagram further illustrating in one example a page buffer PB that may be included in the page buffer circuit of FIG. 2.

FIG. 6 is a circuit diagram further illustrating in one example a page buffer PB that may be included in the page buffer circuit 410 of FIG. 3.

Referring to FIG. 6, the page buffer PB may include a pre-charge circuit 430, a switch circuit 435 and a sense and latch circuit 440.

Here, the pre-charge circuit 430, the switch circuit 435 and/or the sense and latch circuit 440 may variously operate in responsive to one or more control signal(s) provided by the control circuit 500 (e.g., a load signal LOAD, a bitline set-up signal BLSTP, a bitline voltage control signal BLSHF, a bitline selection signal BLSLT, a shield signal SHLD, a refresh signal RFR, a set signal SET and a sensing enable signal SEN_EN).

For example, the pre-charge circuit 430 may supply a pre-charge voltage Vdd to a sensing node SO. The pre-charge circuit 430 may include a first P-channel metal-oxide semiconductor (PMOS) transistor 431 and a second PMOS transistor 432 connected in series between the pre-charge voltage Vdd and the sensing node SO. The first PMOS transistor 431 is turned ON/OFF in response to the load signal LOAD and the second PMOS transistor 432 is turned ON/OFF in response to the bitline set-up signal BLSTP.

The switch circuit 435 may include transistors M1, M2, and M3, wherein the transistor M1 may pre-charge the bitline BL to a predetermined voltage level in response to the bitline voltage control signal BLSHF, the transistor M2 may select the bitline BL in response to the bitline selection signal BLSLT, and the transistor M3 may discharge the bitline BL in response to the shield signal SHLD.

The sense and latch circuit 440 may be used to sense (or detect) a voltage level apparent at the sensing node SO. In this manner, data may be latched according to the detected voltage level apparent at the sensing node SO. The sense and latch 440 may include a latch 441 and N-channel metal-oxide semiconductor (NMOS) transistors MT1~MT4.

In the illustrated example of FIG. 6, the latch 440 includes inverters INV1 and INV2. The NMOS transistors MT1 and MT3 are coupled between a first node N11 and a ground voltage and the NMOS transistors MT2 and MT4 are coupled between a second node N12 and the ground voltage.

The NMOS transistor MT1 includes a gate receiving a set signal SET, the NMOS transistor MT2 includes a gate receiving a reset signal RST, the NMOS transistor MT3 includes a gate receiving the refresh signal RFR, and the NMO transistor MT4 includes a gate coupled to the sensing node SO. The sense and latch circuit 440 may operate in response to various control signals (e.g., SET, SEN_EN and RFR described above). With this configuration, the sense and latch circuit 440 may perform a first sensing and a second sensing of selected memory cells in response to the sensing enable signal SEN_EN which is selectively enabled at the first time and the second time during the develop period.

Figure 7:
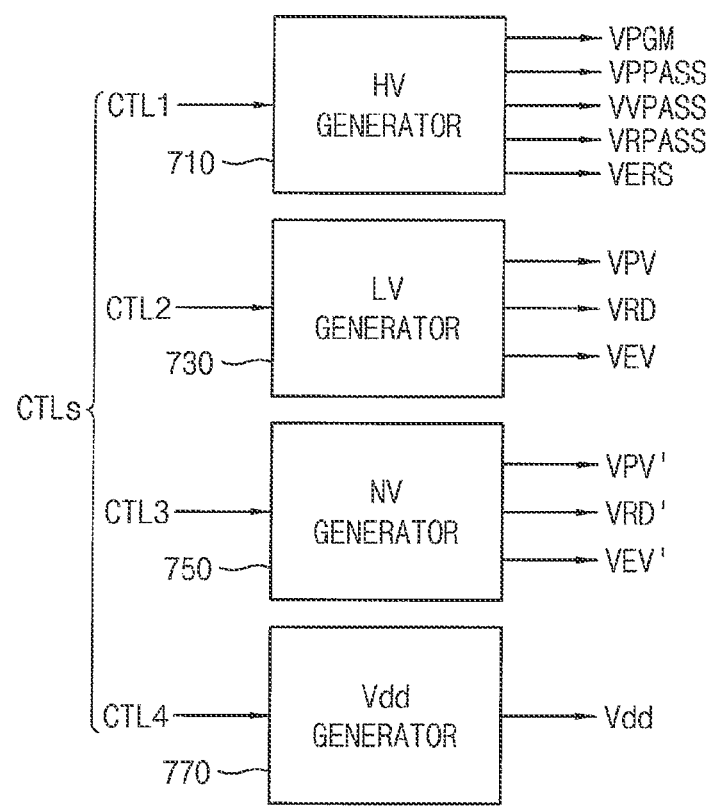
FIG. 7 is a block diagram further illustrating in one example the voltage generator 700 of FIG. 2.

FIG. 7 is a block diagram further illustrating in one example the voltage generator 70 of FIG. 2.

Referring to FIG. 7, the voltage generator 700 may include a high voltage generator 710, a low voltage generator 730, a negative voltage generator 750 and power supply voltage (Vdd) generator 770.

The high voltage generator 710 may be used to generate a program voltage PGM, a program pass voltage VPPASS, a verification pass voltage VVPASS, a read pass voltage VRPASS and an erase voltage VERS according to various operations performed by the NVM 300 in response to one or more command(s) CMD and one or more control signals (e.g., a first control signal CTL1).

Here, the program voltage PGM may be applied to the selected wordline. The program pass voltage VPPASS, the verification pass voltage VVPASS, the read pass voltage VRPASS may be applied to the unselected wordlines. The erase voltage VERS may be applied to a well associated with a memory block. In some embodiments, each one of the respective control signals (e.g., the first control signal CTL1, a second control signal CTL2, a third control signal CTL3 and a fourth control signal CTL4 shown in FIG. 7) may include one or more bits indicating operation(s) associated with the one or more decoded command(s) D_CMD.

The low voltage generator 730 may be used to generate a program verification voltage VPV, an erase verification voltage VER and a default read voltage VRD according to various operations performed by the NVM 300 in response to one or more command(s) CMD and one or control signals (e.g., the second control signal CTL2). The program verification voltage VPV, the default read voltage VRD, and the erase verification voltage VER may be applied to the selected wordline according to the operation being executed by the NVM 300.

The negative voltage generator 750 may be used to generate a program verification voltage VPV', a read voltage VRD' and an erase verification voltage VER' having respective, negative voltage levels according to various operations performed by the NVM 300 in response to one or more command(s) CMD (e.g., the third control signal CTL3).

The power supply voltage generator 770 may also be used to generate one or more power supply voltage(s) (e.g., power supply voltage Vdd) associated with the execution of various operations by the NVM 300 (e.g., the page buffer circuit 410) according to one or more commands CMD (e.g., the fourth control signal CTL4).

Figure 8:
FIG. 8 is a block diagram further illustrating in one example the page buffer circuit 410 of FIG. 2.

FIG. 8 is a block diagram further illustrating in one example the page buffer circuit 410 of FIG. 2.

Referring to FIG. 8, the page buffer circuit 410 may include a plurality of page buffers 411~41n coupled to the memory cell array 310 through the bitlines BL1~BLn. Each of the page buffers 411-41n includes a sensing latch SL, data latches DL1, DL2 and DL3 and a cache latch CL.

Figure 9A:
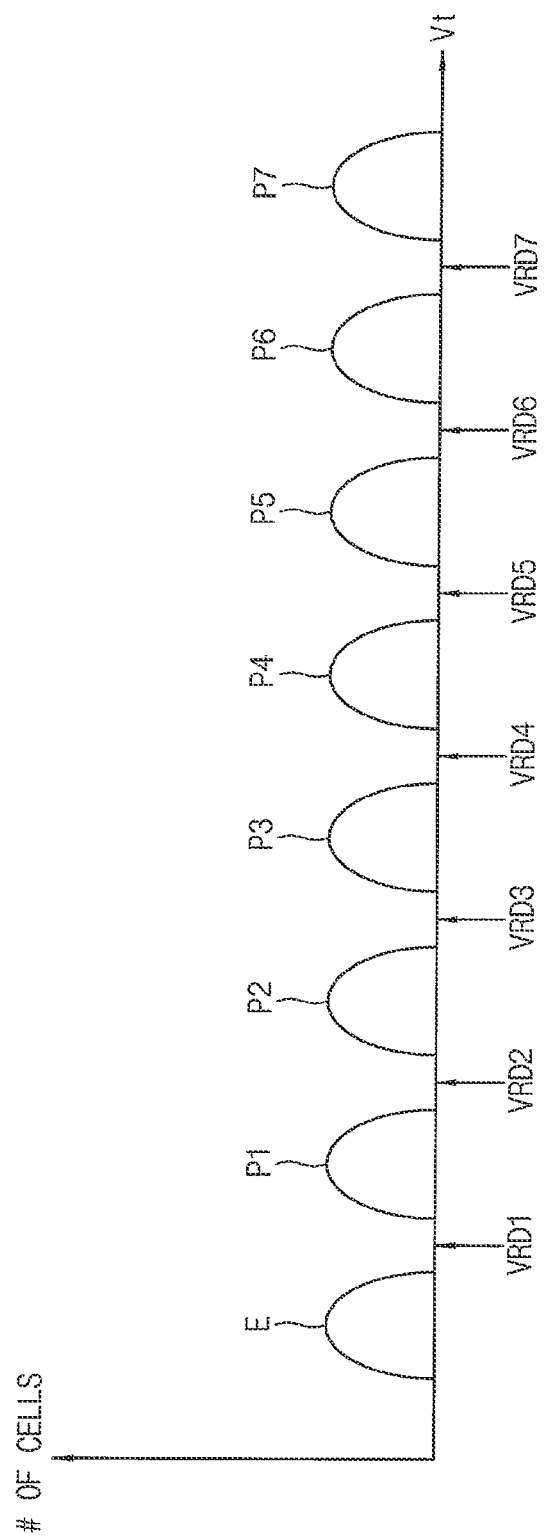
FIGS. 9A and 9B are respective conceptual diagrams illustrating threshold voltage distributions for memory cells of the memory cell array of FIG. 2.
Figure 9B:
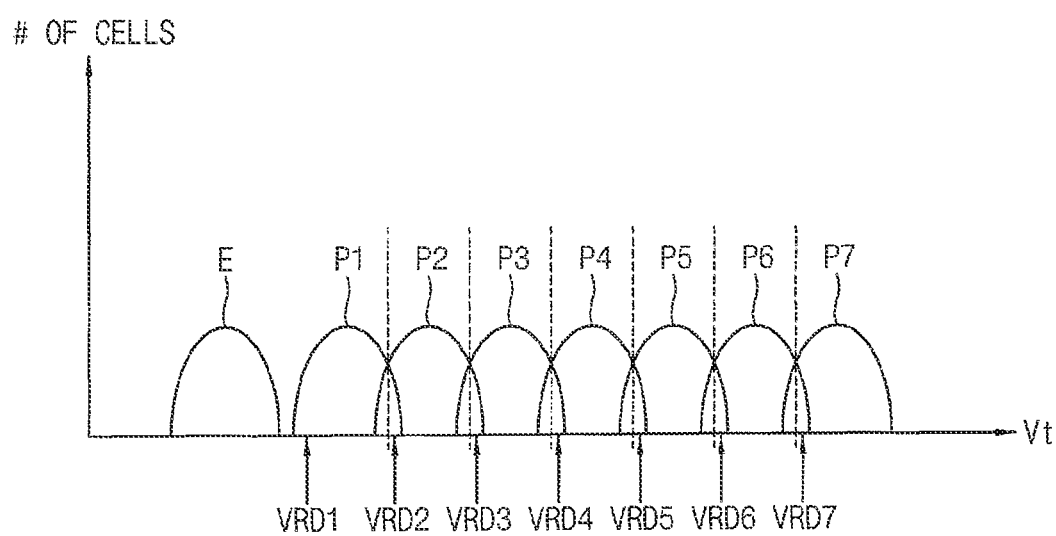

FIGS. 9A and 9B are respective graphs illustrating exemplary threshold voltage distributions for one page of data in the memory cell array 310 of FIG. 2.

Here, it is assumed that memory cells of the NVM 300 are triple level cells (TLC) configured to store three (3) bits of data. Accordingly, a set of read voltages used to determine the various program states of memory cells includes seven (7), respective read voltages (e.g., VRD1, VRD2, VRD3, VRD4, VRD5, VRD6 AND VRD7).

Referring to FIG. 9A, each memory cell of the NVM 300 may be programmed into an erase state E, or one of first through seventh program states (e.g., P1, P2, P3, P4, P5, P6 and P7). In accordance with information received from an external memory controller, for example, the NVM 300 may determine various program states for selected memory cells. Thereafter, data from the selected memory cells may be read using the read voltages VRD1 through VRD7.

In this regard, certain default levels may be assumed (or predetermined) for the respective read voltages VRD1 through VRD7 depending on various memory cell characteristics. For example, voltage levels for the default read voltage set VRD1 through VRD7 may be predetermined depending on a desired threshold voltage distribution following programming of the memory cells.

However, the ideal threshold voltage distribution of FIG. 9A is rarely maintained during practical use of the NVM 300, and the constituent memory cells—due to varying physical characteristics and/or external factors over an elapsed time following programming of the memory cells—may drift into relationships more realistically illustrated in FIG. 9B. For this reason among others, the read data obtained by a read operation using the default read voltage set VRD1 through VRD7 may generate one or more data error(s).

Recognizing these realities, certain nonvolatile memories according to embodiments of the inventive concept advantageously sense selected memory cells—having a threshold voltage distribution more like FIG. 9B than FIG. 9A—at a first time during a develop period in order to internally generate a randomness in the resulting data (e.g., the random data RND described in relation to FIG. 2). In this regard, FIG. 10A further illustrates a particularly relevant portion (e.g., a memory cell array 310a, as well as page buffer circuit 410, encryption circuit 470 and data I/O circuit 480) are shown.

Figure 10A:
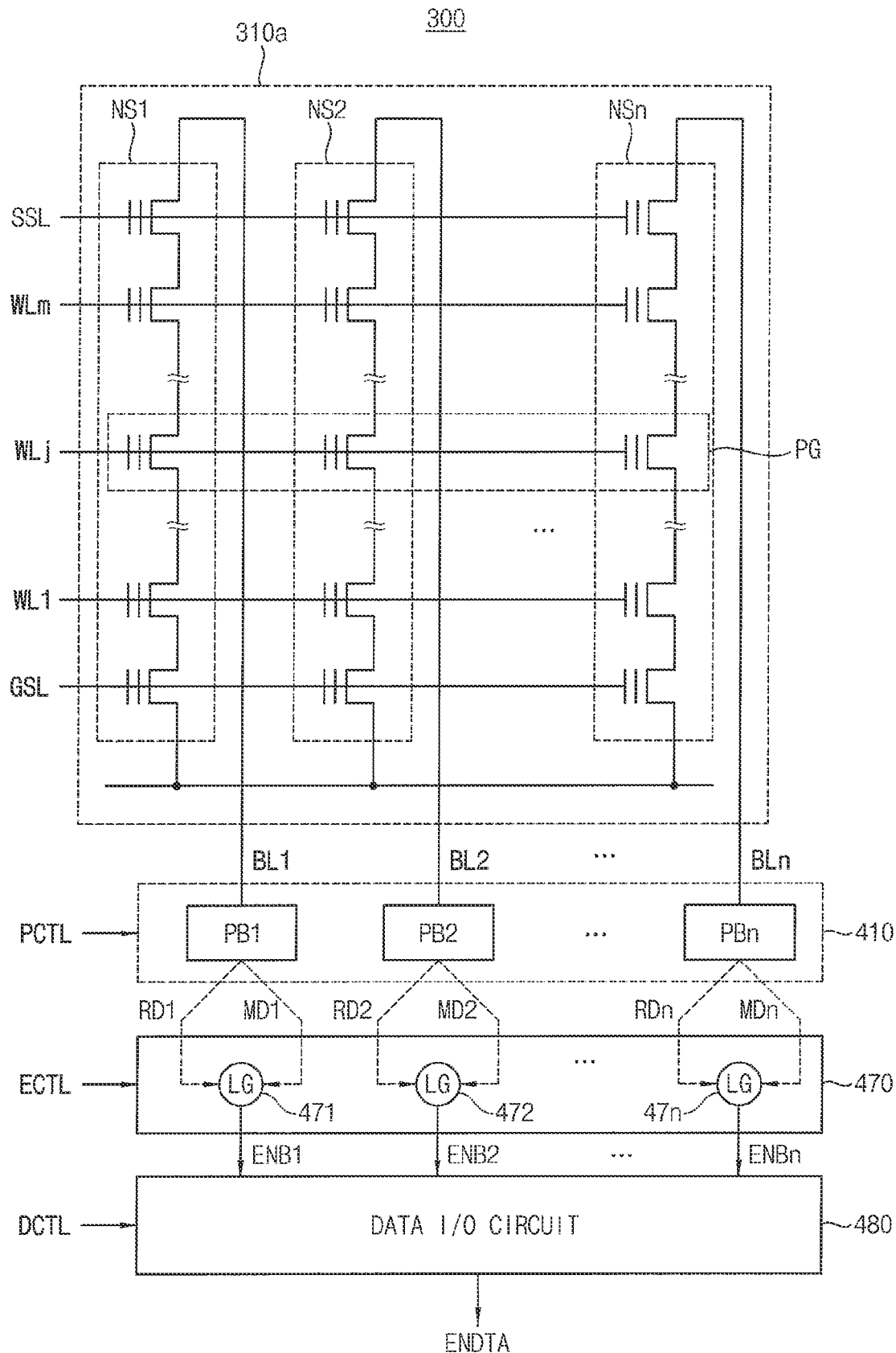
FIG. 10A is a circuit diagram illustrating a portion of the nonvolatile memory device of FIG. 2.

Referring to FIG. 10A, the memory cell array 310a may include NAND strings NS1~NSn coupled between a common source line CSL and bitlines BL1~BLn. Each of the NAND strings NS1~NSn may include a string selection transistor coupled to a string selection line SSL, memory cells, which are connected in series, coupled to wordlines WL1~WLm, where 'm' is a natural number greater than two, a ground selection transistor coupled to a ground selection line GSL. The memory cells coupled in a direction in which the each of the wordlines WL1~WLm extends are referred to a page PG and memory cells in the page PG coupled to a selected wordline WLj are referred to as selected memory cells.

The page buffer circuit 410 may include page buffers PB1~PBn coupled to respective NAND strings NS1~NSn through respective bitlines BL1~BLn. The page buffers PB1~PBn sense the selected memory cells in the selected page PG at the first time and the second time during the develop period in response to the page buffer control signal PCTL in order to provide bits RD1~RD1 of the random data RND and bits MD1~MDn of the main data MDTA to the encryption circuit 470, respectively.

The encryption circuit 470 may include logic circuits (LG)s 471~472, and each of the logic circuits 471~47n may correspond to a respective one of the page buffers PB1~PBn. Each of the logic circuits 471~47n may perform a logic operation on respective one of the bits RD1~RD1 of the random data RND and respective one of the bits MD1~MDn of the main data MDTA to output respective one of bits ENB1~ENBb of the encrypted main data ENDTA. Here, the logical operation may be an exclusive OR operation or an exclusive NOR operation, for example.

The data I/O circuit 480 may output the encrypted main data ENDTA to an external circuit in response to the control signal DCTL.

Figure 10B:
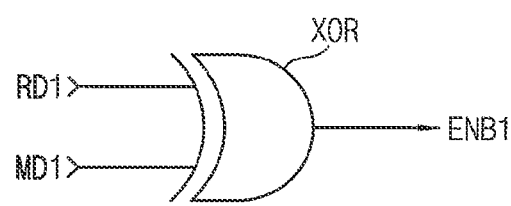
FIG. 10B is a circuit diagram illustrating an example of one of the logic gates in FIG. 10A.
Figure 10C:
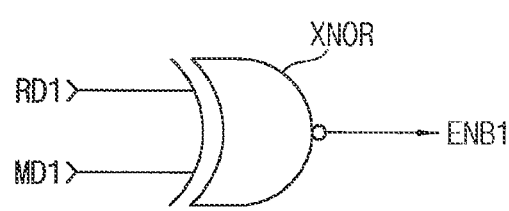
FIG. 10C is a circuit diagram illustrating an example of one of the logic gates in FIG. 10A.

FIGS. 10B and 10C are respective circuit diagrams illustrating examples of logic gates LG that may be used in the NVM 300 of FIG. 10A.

In FIG. 10B, the logic gate 471 among the logic circuits 471~47n is illustrated and each of other logic gates 472~47n may have a same configuration as the logic gate 471. Referring to FIG. 10B, a logic gate 471a may include XOR gate. The XOR gate may perform XOR (exclusive OR) operation on a random data bit RD1 and a main data bit MD1 to output an encrypted bit ENB1.

In FIG. 10C, the logic gate 471 among the logic circuits 471~47n is illustrated and each of other logic gates 472~47n may have a same configuration as the logic gate 471. Referring to FIG. 10C, a logic gate 471b may include XNOR gate. The XNOR gate may perform XNOR (exclusive NOR) operation on the random data bit RD1 and the main data bit MD1 to output an encrypted bit ENB1.

Figures 11A, 11B:
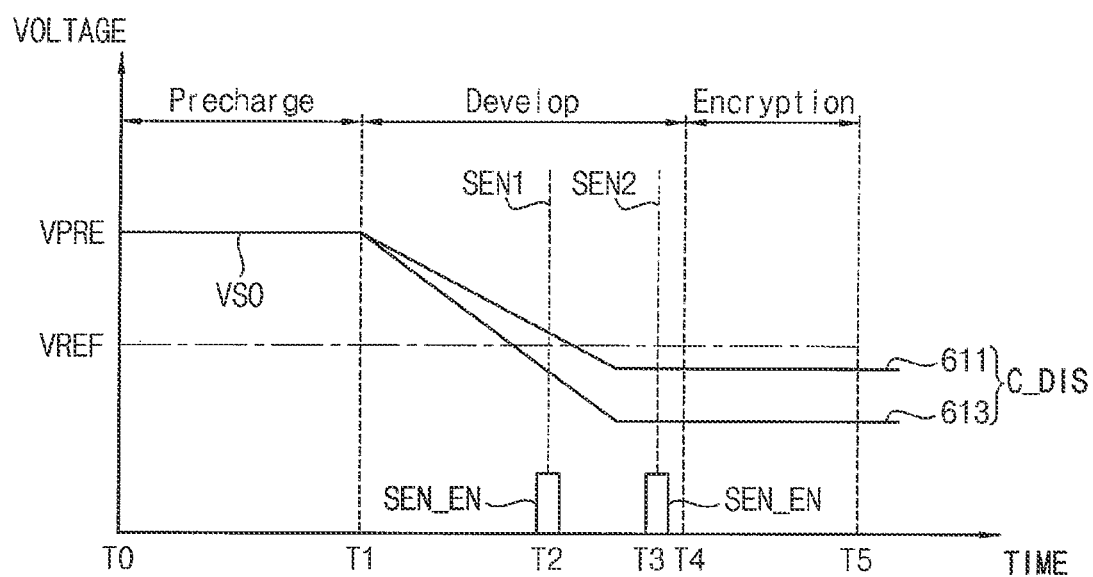
FIG. 11A is a conceptual diagram illustrating a level change for a sensing node of the page buffer of FIG. 6.
FIG. 11B is a logic table showing latched data resulting from different threshold voltage distributions.

FIG. 11A is a conceptual diagram illustrating a level change of a sensing node of the page buffer in FIG. 6. FIG. 11B is a logic table illustrating logic levels latched for memory cells having different threshold voltage distributions.

Referring to FIG. 11A, the level change of the sensing node SO may depend on the threshold voltage level of memory cells. Accordingly, a latch result will depend on the time at which the "sensing" is performed. For example, the period between time T0 and time T1 may be referred to as a precharge period (Pre-charge), the period between time T1 and time T4 may be referred to as a develop period (Develop), and the period between time T4 and time T5 may be referred to as an encryption period (Encryption).

Here, the load signal LOAD may be deactivated during the develop period, and the bitline voltage control signal BLSHF may be deactivated during the encryption period, for example.

Referring to FIGS. 6 and 11A, during the precharge period, both of the load signal LOAD and the bitline voltage control signal BLSHF may be activated to precharge the bitline BL and the sensing node SO. Hence, during the precharge period, the sensing node SO may be charged to a precharge voltage VPRE.

At time T1 at which the develop period starts, the load signal LOAD may be deactivated. During the develop period, the bitline voltage control signal BLSHF may be maintained in an activated state. Accordingly, electrical charge accumulated at the sensing node SO may move to the bitline BL according to the threshold voltage level of a memory cell. As a result, the voltage level apparent at the sensing node SO may change (e.g., as indicated by reference numerals 611 and 613 in FIG. 11A) in response to the threshold voltage distribution C_DIS of the memory cells. For example, the reference numeral 611 may indicate a level change for the sensing node SO coupled to a first memory cell #1 and the reference numeral 613 may indicate a level change of the sensing node SO coupled to a second memory cell #2.

At time T2 (e.g., the first sensing time) during the develop period, when the level of the sensing node SO is latched by activating the sensing enable signal SEN_EN by the first sensing SEN1, a random data bit having a logic value of '0' may be latched as random data because the level of the sensing node SO coupled to the first memory cell #1 is greater than a reference voltage VREF, whereas a random data bit having a logic value of '1' may be latched as random data because the level of the sensing node SO coupled to the second memory cell #2 is less than the reference voltage VREF.

However, at time T3 (e.g., the second sensing time) during the develop period, when the level of the sensing node SO is latched by activating the sensing enable signal SEN_EN by the second sensing SEN2, a main data bit having a logic value of '1' may be latched because the level of the sensing node SO coupled to the first memory cell #1 is less than the reference voltage VREF, whereas a main data bit having a logic value of '1' is latched because the level of the sensing node SO coupled to the second memory cell #2 is also less than the reference voltage VREF.

During the encryption period, the encrypted main data ENDTA may be output by performing an XOR operation between the random data and the main data of the first memory cell and the second memory cell.

Figure 12:
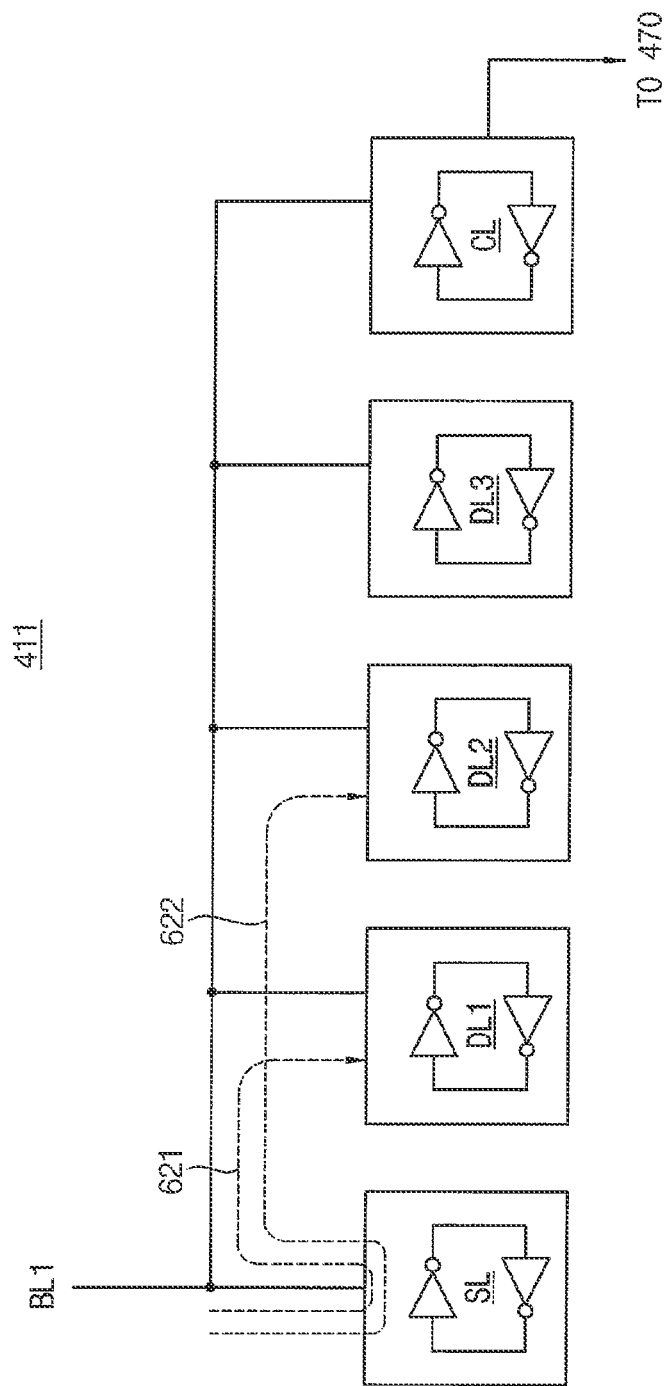
FIG. 12 is a circuit diagram further illustrating in one example the operation of the page buffer circuit of FIG. 8.

FIG. 12 is a block diagram further illustrating an operation that may be performed by the page buffer circuit 411 of FIG. 8.

Although operation of the page buffer 411 is illustrated with reference to FIG. 12, the operation of each of other page buffers 412~41n may be substantially similar with the operation of the page buffer 411.

Referring to FIG. 12, the page buffer 411 includes a sensing latch SL, data latches DL1~DL3 and a cache latch CL which are connected in parallel with the bitline BL1 at the sensing node SO. Data sensed by using a first read voltage in the first sensing is stored in the first data latch DL1 via the sensing latch SL as a reference numeral indicates 621, and data sensed by using the first read voltage in the second sensing is stored in the second data latch DL2 via the sensing latch SL as a reference numeral indicates 622. The data stored in the data latches DL1 and DL2 may be provided to the encryption circuit 470 in response to the page buffer control signal PCTL.

Therefore, the NVM 300 of FIG. 2 may generate the random data RND by sensing the selected memory cells at a first time during a develop period using physical characteristic (threshold voltage distributions) of memory cells in the memory cell array 310, and may encrypt the main data MDTA using the internally-generated random data RND to output the encrypted data ENDTA to an external circuit.

Figure 13:
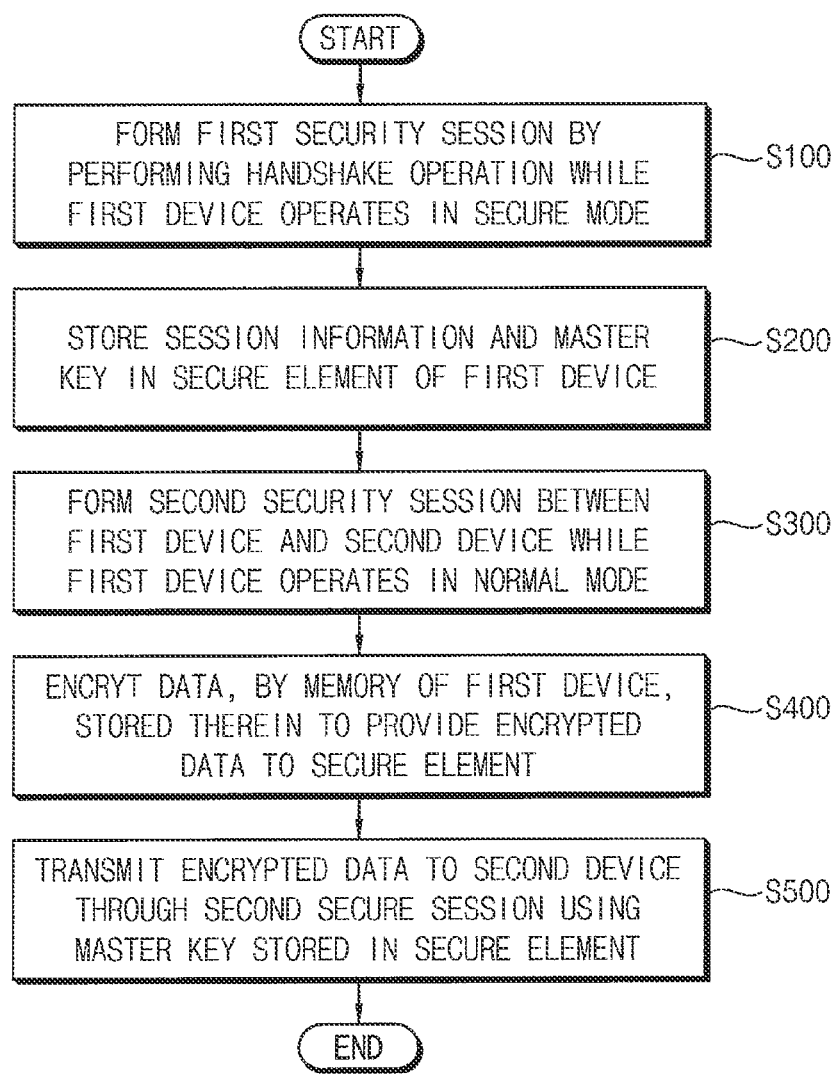
FIG. 13 is a flowchart summarizing in one example a method of performing secure communication according to embodiments of the inventive concept.

FIG. 13 is a flow chart summarizing in one example a method of performing secure communication according to embodiments of the inventive concept. In this regard, a "first device" is assumed to be a user device and a "second device" is assumed to be a compatible external device.

Referring to FIG. 13, the method of performing secure communication may include forming a first security session between the first device and the second device while the first device operates in a secure mode (S100). The first security session may be using (e.g.,) a defined handshaking operation between the first device and the second device. As will be described with reference to FIG. 15, the first device may selectively operate in either the secure mode and a normal mode, where the normal mode is assumed to be a non-secure mode. The first security session may be formed in the secure mode, and may be used by the first device and/or the second device only in the secure mode. In other words, the first security session may be deemed (or available) only in the secure mode. An exemplary handshaking operation will be described hereafter with reference to FIG. 17.

Session information and a master key (or a master secret) may be stored in a secure element (e.g., a memory or latch) included in the first device (S200). The session information and master key may be generated during the formation of the first security session (e.g., during S200). The session information may include, for example, an internet protocol (IP) address, a port number, a certificate, etc. The master key may be used to establish secure communication between the first device and the second device. An exemplary configuration for the first device including a secure element will be described hereafter with reference to FIG. 14.

A second security session may be formed between the first device and the second device while the first device operates in the normal mode (S300). The second security session may be formed without execution of the handshaking operation, and may be formed by loading the session information stored in the secure element. Thus, the master key need not be stored in the secure element during the second security session.

Here, the second security session may be formed in the normal mode, and may be used by the first device and the second device only for the normal mode. In other words, the second security session may be deemed valid (or available) only in the normal mode. As will be described with reference to FIG. 15, the first security session and the second security session may not be physically distinguishable one from the other by potential hackers. Nonetheless, the first security session and the second security session are logically different. In other words, the first security session and the second security session may be formed based on the same session information, and may then be formed through a single channel (e.g., through the same channel).

The first device provides the second device with encrypted data through the second security session by internally encrypting user data in a memory in the first device (S400). The memory may correspond to NVM 300 described above in relation to the embodiments of FIGS. 1 through 12. Therefore, the memory may sense selected memory cells at a first time and at a second time during a develop period in order to respectively provide random data and main data using physical characteristic of memory cells. Thereafter, the main data may be encrypted using the internally-generated random data in order to provide encrypted main data to the secure element.

The first device may transmit the encrypted main data to the second device through the second security session based on the master key stored in the secure element (S500). That is, the first device may transmit the encrypted main data to the second device while the first device operates in the normal mode. As described above, the master key is not loaded from the secure element while the second security session is formed. Thus, to transmit the encrypted data to the second device, the first device may forward or transfer output data that is to be transmitted to the second device to the secure element. The secure element included in the first device may encrypt the output data.

In the method of performing the secure communication described above, the first device may operate in either the secure mode or the normal mode, and a security session may be formed between the first device and the second device in each of the secure mode and the normal mode. A security session in the secure mode may be formed by performing the handshaking operation, and the session information may be generated in the secure mode. A security session in the normal mode may be formed without the handshaking operation, and may be formed based on the session information that is generated in safety in the secure mode. The secure element may be used for sharing the session information in safety in both the secure mode and the normal mode. Accordingly, a cryptographic protocol of forming the security session between the first device and the second device may become relatively simple and light with the same security level in both the secure mode and the normal mode, and then a secure communication system performing the method may have relatively improved performance.

Figure 14:
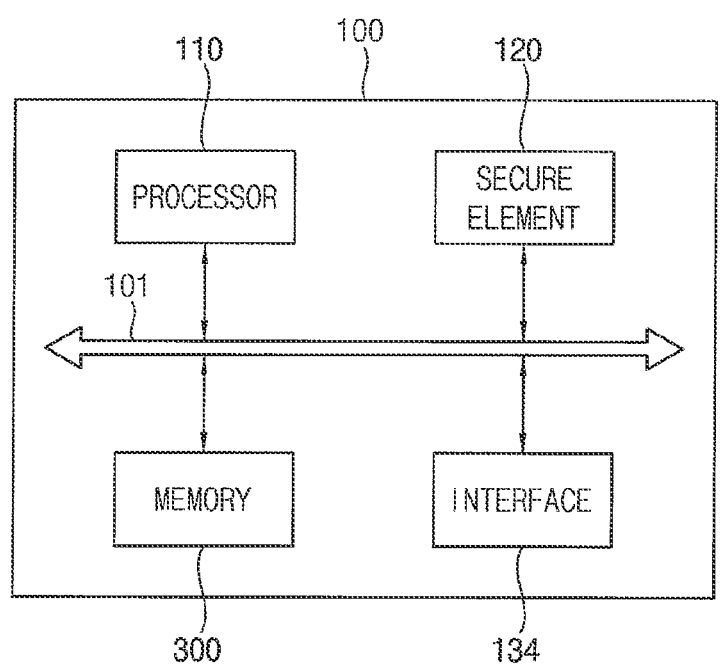
FIG. 14 is a block diagram illustrating in one example a first device capable of implementing a method of performing secure communication according to embodiments of the inventive concept.

FIG. 14 is a block diagram illustrating in one example the first device described above in relation to the foregoing method of performing secure communication according to embodiments of the inventive concept.

Referring to FIG. 2, a first device 100 includes a processor 110 and a secure element 120. The first device 100 may further include a bus 101, a memory 300 and an interface unit 140. For convenience of illustration, some elements of the first device 100 that are unrelated to the method according to embodiments are omitted in FIG. 2.

The processor 110 may be responsible for controlling overall operations of the first device 100. For example, the processor 110 may be used to perform various computational functions such as particular calculations and tasks, may execute an operating system (OS) to drive the first device 100, and may execute various applications such as providing an internet browser, executing a game, displaying a video file, controlling a camera module, etc. For example, the processor 110 may be a central processing unit (CPU), a microprocessor, an application processor (AP), etc. For example, the processor 110 may include a single processor core or a plurality of processor cores.

In some embodiments, as will be described with reference to FIG. 15, the processor 110 may be driven based on a secure OS and a normal OS. The normal OS may be referred to as a non-secure OS. The processor 110 and the first device 100 including the processor 110 may operate in the secure mode and may execute secure applications based on the secure OS. The processor 110 and the first device 100 including the processor 110 may operate in the normal mode and may execute normal applications based on the normal OS.

The secure element 120 may process and/or may store secure data such as a cryptographic key, sensitive data, a sensitive code, or the like. For example, the secure element 120 may be resistant against tampering attacks, such as micro-probing, a software attack, eavesdropping, a fault generation attack, etc. The secure element 120 may be referred to as a security hardware, a security component or a security module.

In some embodiments, the processor 110 and the secure element 120 may store a pre-shared key that is used for performing the method according to embodiments. For example, the pre-shared key may be pre-stored in a storage (e.g., a read-only memory (ROM)) of the first device 100 in manufacturing of the first device 100. For example, to improve security of the first device 100, the processor 110 and the secure element 120 may individually and separately store the pre-shared key into different storages (e.g., storages 201a, 201b and 226 in FIG. 15)

The memory 300 may be sued to store data and/or instructions that are processed and/or executed by the processor 110. For example, the memory 300 may store a boot image for booting the first device 100, a file system for the OS to drive the first device 100, a device driver for an external device connected to the first device 100, and/or an application executed on the first device 100. For example, the memory 300 may include a flash memory. As described above, the memory may employ the NVM 300 of FIG. 2.

The interface unit 140 may communicate with an external device. The external device may be a second device that is interoperable with the first device 100 to perform the method according to embodiments. For example, the interface unit 140 may communicate with the external device based on WiFi communication. For another example, the interface unit 140 may communicate with the external device based on a wireless mobile communication, such as 3G, 4G, long term evolution (LTE), etc. Alternatively, the interface unit 140 may communicate with the external device based on other communications, such as Bluetooth, near field communication (NFC), radio-frequency identification (RFID), etc. In addition, the interface unit 140 may further include a memory interface that communicates with an external storage and/or an external memory.

The processor 110, the secure element 120, the memory 300 and the interface unit 140 may be connected to one another via the bus 101.

Figure 15:
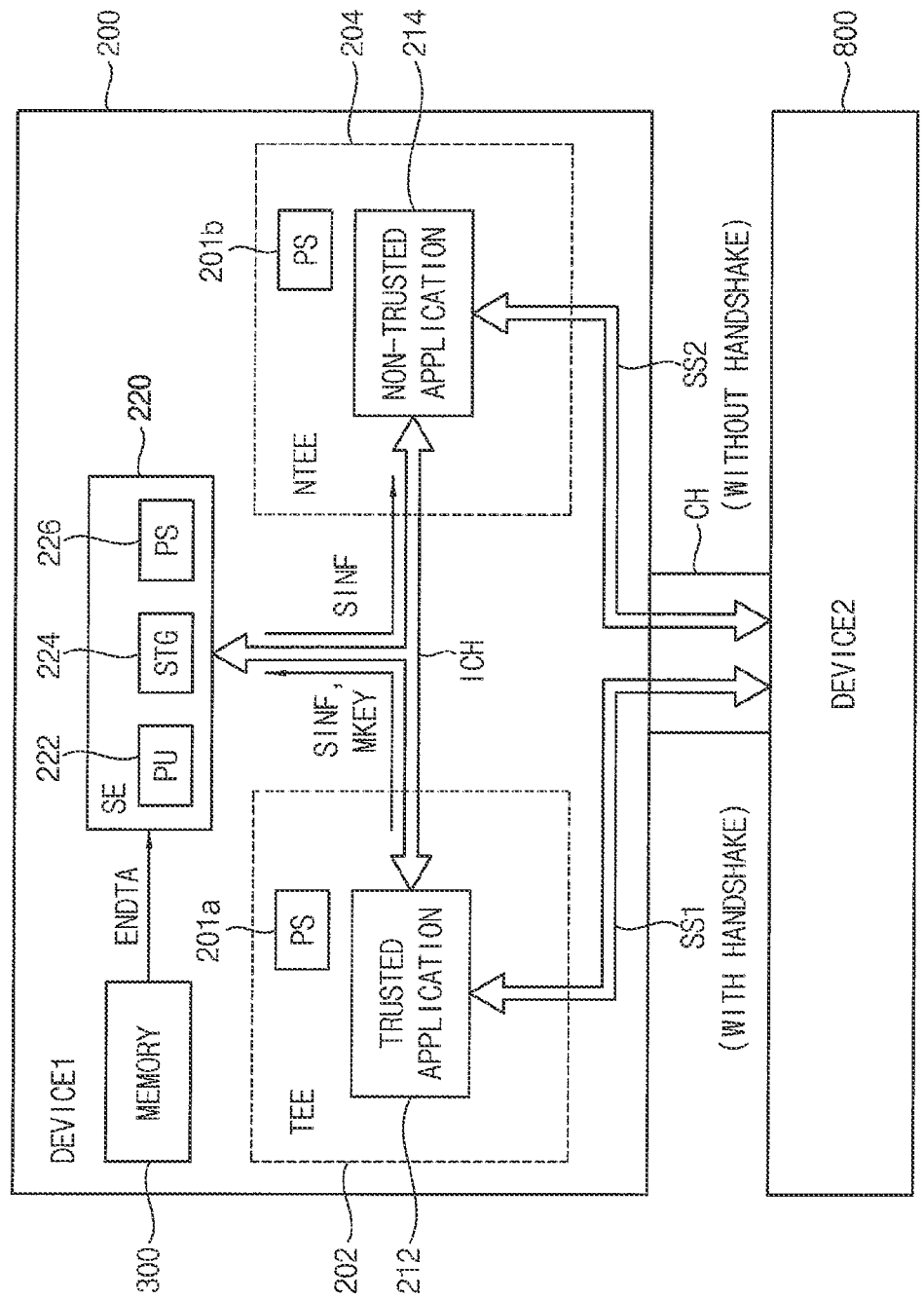
FIGS. 15, 16, 17, 18, 19, 20 and 21 are respective, conceptual diagrams further illustrating in various examples methods of performing secure communication according to embodiments of the inventive concept.
Figure 16:
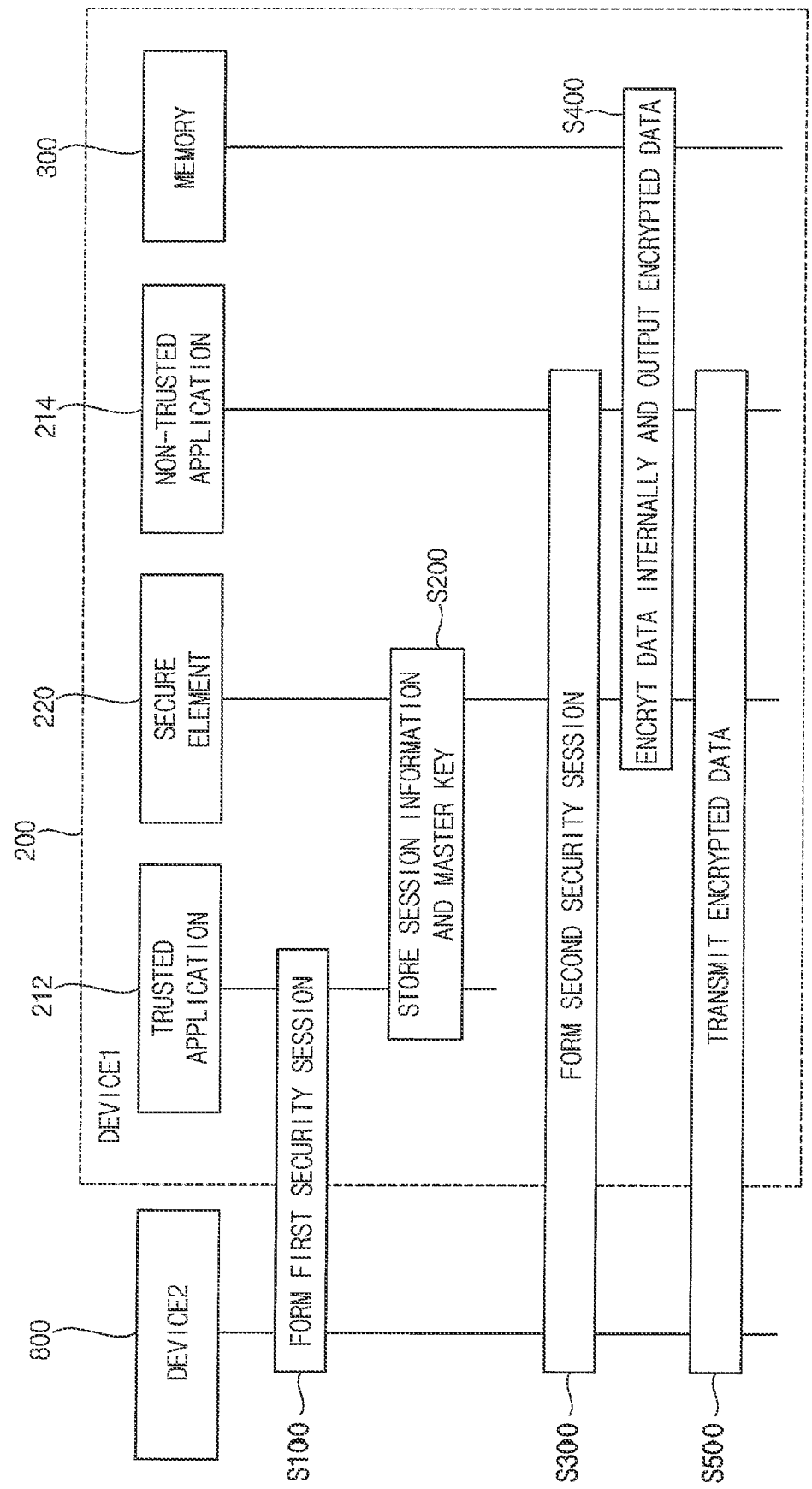

FIGS. 15 and 16 are diagrams further describing a method of performing secure communication according to embodiments of the inventive concept. FIG. 15 is a block diagram illustrating in one example certain software and/or hardware configurations that may be used in a secure communication system to establish a security session in certain embodiments of the inventive concept. FIG. 16 is a conceptual diagram further illustrating a method of performing secure communication using the software and/or hardware configuration of FIG. 15.

Referring to FIG. 15, a secure communication system according to embodiments includes a first device (a user device) 200 and a second device (an external device) 800. The secure communication system may further include a channel CH that connects the first device 200 with the second device 800. For example, the channel CH may include a wired channel and/or a wireless channel.

In some embodiments, the first device 200 may be a client device, and the second device 800 may be a server. For example, the client device may include any computing or mobile device, such as a mobile phone, a smart phone, a tablet computer, a laptop computer, a personal digital assistants (PDA), a portable multimedia player (PMP), a digital camera, a portable game console, a music player, a camcorder, a video player, a navigation system, a wearable device, an internet of things (IoT) device, an internet of everything (IoE) device, an e-book, a virtual reality (VR) device, an augmented reality (AR) device, a robotic device, etc.

In some embodiments, when the secure communication system is an IoT system, the first device 200 may be an IoT device, and the second device 800 may be a router. IoT devices may be classified into several groups depending on their characteristics. For example, the IoT devices may be classified into a home gadget group (e.g., a group 1010 in FIG. 22), a home appliances/furniture group (e.g., a group 1020 in FIG. 22), an entertainment group (e.g., a group 1030 in FIG. 12), a vehicle group (e.g., a group 1040 in FIG. 22), etc. The router may include a hub, a gateway, an access point (AP), etc.

For example, the home gadget group may include a heart rate sensor patch, a medical tool for measuring blood glucose, a lighting equipment, a hygrometer, a surveillance camera, a smart watch, a security keypad, a temperature controller, an aroma diffuser, a window blind, etc. The home appliances/furniture group may include a robot vacuum cleaner, a washing machine, a refrigerator, an air conditioner, a television (TV), a furniture (e.g., a bed including a sensor), etc. The entertainment group may include a TV, a smart TV, a smart phone, a multimedia video system, etc.

As used herein, "IoT" may refer to a network of IoT devices that use wired and/or wireless communication. Accordingly, the IoT may be referred to as an IoT network system, a ubiquitous sensor network (USN) communication system, a machine type communication (MTC) system, a machine-oriented communication (MOC) system, a machine-to-machine (M2M) communication system, or a device-to-device (D2D) communication system. The IoT network system may use a user datagram protocol (UDP), a transmission protocol such as a transmission control protocol (TCP), an IPv6 low-power wireless personal area networks (6LoWPAN) protocol, an IPv6 internet routing protocol, a constrained application protocol (CoAP), a hypertext transfer protocol (HTTP), a message queue telemetry transport (MQTT), or an MQTT for sensors networks (MQTT-S) for exchange (or communication) of information among at least two elements therewithin.

The first device 200 may operate in one of the secure mode and the normal (non-secure) mode. In the first device 200, the secure OS may be executed in the secure mode, and then a trusted execution environment (TEE) 202 may be implemented in the secure mode. A trusted application 212 may be executed in the secure mode and the trusted execution environment 202. In addition, in the first device 200, the normal (non-secure) OS may be executed in the normal mode, and then a non-trusted execution environment (NTEE) 204 may be implemented in the normal mode. A non-trusted application 214 may be executed in the normal mode and the non-trusted execution environment 204.

For example, the secure mode and the trusted execution environment 202 may be implemented based on the "Trust-Zone®" technique developed by ARM Ltd. In this example, although not illustrated in FIG. 15, the first device 200 may further include a generic interrupt controller (GIC), a trustzone protection controller (TZPC), a trustzone memory adapter (TZMA), a contents firewall (CFW), an address space protector (ASP), etc. For example, the non-trusted execution environment 204 may be referred to as a rich execution environment (REE), and the non-trusted application 214 may be referred to as a normal application or a client application.

When the first device 200 operates in the secure mode and the trusted execution environment 202, and/or when the first device 200 executes the trusted application 212, the first device 200 may communicate with the second device 800 via a first security session SS1. When the first device 200 operates in the normal mode and the non-trusted execution environment 204, and/or when the first device 200 executes the non-trusted application 214, the first device 200 may communicate with the second device 800 via a second security session SS2. The first and second security sessions SS1 and SS2 may be just logically distinct form one another. The first and second security sessions SS1 and SS2 may be formed based on the same session information (e.g., based on session information SINF), and then may be formed through a single channel (e.g., through a channel CH). For example, the first and second security sessions SS1 and SS2 may be formed based on a transport layer security (TLS) scheme, and then the channel CH may be referred to as a TLS channel The first device 200 may include a secure element (SE) 220 and an internal channel ICH. The secure element 220 may include a processing unit (PU) 222, a storage (STG) 224 and a pre-stored region (PS) 226. The processing unit 222 may handle or process secure data such as a cryptographic key, sensitive data, a sensitive code, or the like. The storage 224 may store the secure data. The pre-stored region 226 may store a pre-shared key (e.g., may pre-store the pre-shared key in manufacturing of the first device 200). As with the pre-stored region 226, pre-stored regions 201a and 201b may store the pre-shared key, respectively.

An internal communication of the first device 200 (e.g., a communication between a processor and the secure element 220) may be performed via the internal channel ICH. The pre-shared key may be used for performing the internal communication. For example, when the first device 200 operates in the secure mode and the trusted execution environment 202, and/or when the first device 200 executes the trusted application 212, the pre-shared key stored in the pre-stored region 201a may be used for performing the internal communication. When the first device 200 operates in the normal mode and the non-trusted execution environment 204, and/or when the first device 200 executes the non-trusted application 214, the pre-shared key stored in the pre-stored region 201b may be used for performing the internal communication. For example, the internal channel ICH may be referred to as a SE channel.

In some embodiments, if the trusted execution environment 202 (e.g., the secure mode) and the non-trusted execution environment 204 (e.g., the normal mode) are implemented by a single processor (e.g., the processor 110 in FIG. 14), the pre-stored regions 201a and 201b may not be physically separated from each other, but may be physically the same region. In other embodiments, if the trusted execution environment 202 and the non-trusted execution environment 204 are implemented by different processors (e.g., the processors 110a and 110b in FIG. 3), the pre-stored regions 201a and 201b may be physically separated from each other. In some embodiments, the pre-stored region 226 may be physically separated from the pre-stored regions 201a and 201b.

Referring to FIGS. 15 and 16, the method of performing the secure communication according to embodiments will be described based on the software and/or hardware configuration of the secure communication system according to embodiments of the inventive concept.

A processor (e.g., the processor 110 in FIG. 14) included in the first device 200 may execute the secure OS and the trusted application 212, and then the first device 200 and the processor may operate in the secure mode and the trusted execution environment 202. In FIG. 16, and in FIGS. 17 and 18 after FIG. 16, a block illustrated as the trusted application 212 may correspond to the processor that is included in the first device 200 and operates in the secure mode. In the secure mode, the handshaking operation is performed between the processor included in the first device 200 and the second device 800, and then the first security session SS1 is formed between the processor and the second device 800 (e.g., between the first device 200 and the second device 800) (S100).

In the secure mode, the processor transmits the session information SINF and a master key MKEY that are generated by forming the first security session SS1 to the secure element 220, and then the session information SINF and the master key MKEY are stored into the secure element 220 included in the first device 200 (S200).

After the foregoing (S100 and S200), a processor (e.g., the processor 110 in FIG. 14) included in the first device 200 may execute the normal OS and the non-trusted application 214, and then the first device 200 and the processor may operate in the normal mode and the non-trusted execution environment 204. In FIG. 16, and in FIGS. 19, 20 and 21 after FIG. 16, a block illustrated as the non-trusted application 214 may correspond to the processor that is included in the first device 200 and operates in the normal mode. In the normal mode, the processor included in the first device 200 loads the session information SINF stored in the secure element 220, and then the second security session SS2 is formed between the processor and the second device 800 without the handshaking operation (e.g., between the first device 200 and the second device 800) (S300).

During the second session SS2 is formed, a memory (e.g., the memory 300 in FIG. 14) autonomously encrypts user data stored therein and provides the encrypted data to the secure element (S400).

In the normal mode, the processor transmits the encrypted data to the second device 800 through the second security session SS2 based on the master key MKEY stored in the secure element 220 (S500).

Of note, the various operations (or method steps) S100, S200, S300, S400 and S500 described in relation to FIG. 16 may be substantially the same as the operations (or method steps) S100, S200, S300, S400 and S500 described in relation to FIG. 13, respectively.

Figure 17:
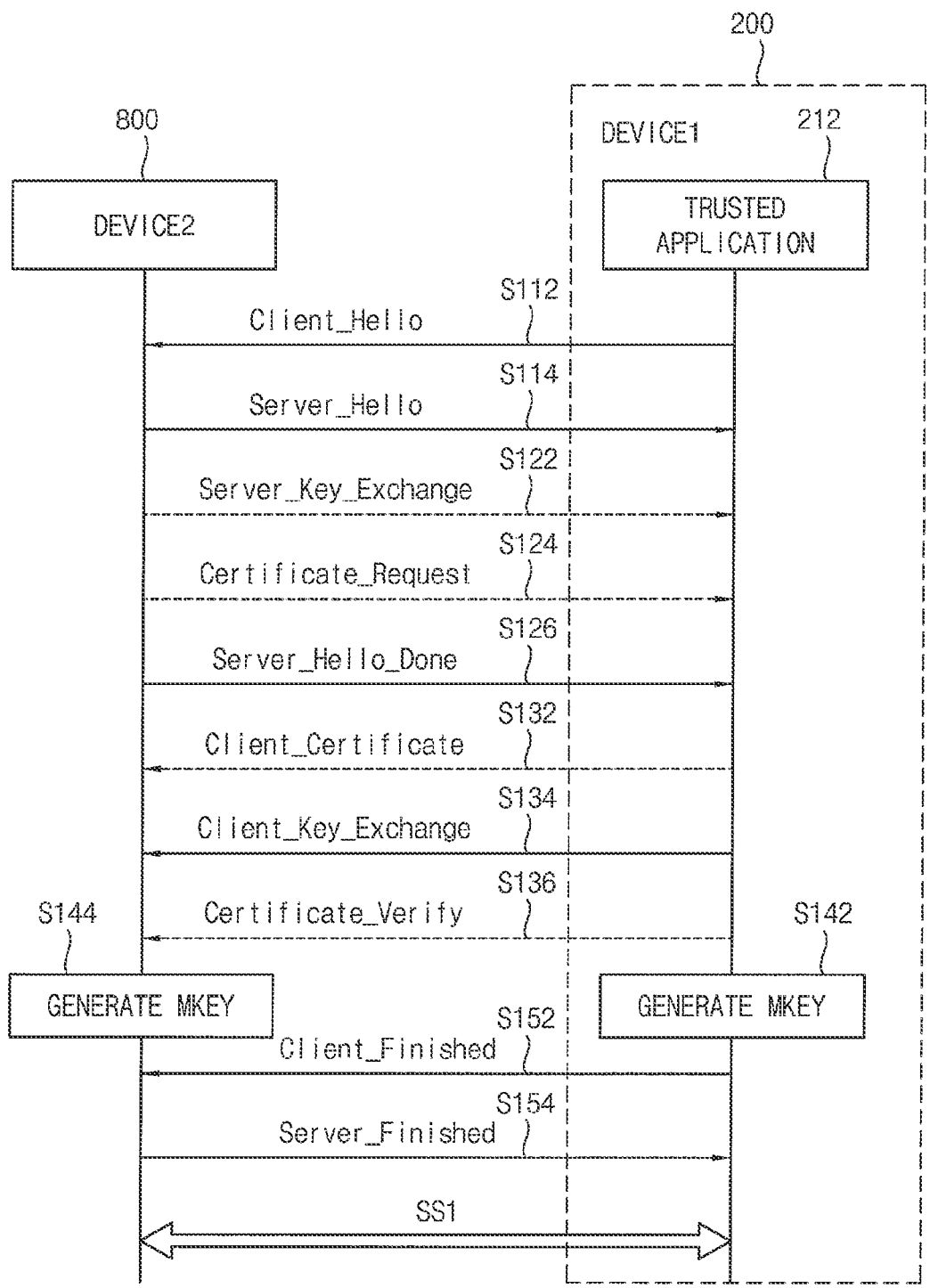

FIG. 17 is a conceptual diagram illustrating in one example a method of forming the first security session described in relation to FIG. 16. In FIG. 17, each of dotted arrows represents an optional operation that may be selectively performed.

Referring to FIGS. 16 and 17, in order to form the first security session SS1 (e.g., S100), the processor (e.g., the processor 110 in FIG. 14) included in the first device 200 operates in the secure mode may exchange a first connection attempt message and a second connection attempt message with the second device 800. For example, the processor may transmit the first connection attempt message to the second device 800 (S112), and the second device 800 may transmit the second connection attempt message to the processor in response to the first connection attempt message (S114).

For example, a "Client_Hello" message illustrated in FIG. 17 may represent the first connection attempt message, and a "Server_Hello" message illustrated in FIG. 17 may represent the second connection attempt message. In some embodiments, the first connection attempt message may include a protocol version that is to be performed by the first device 200, a random number of the first device 200, a session identification (ID) of the first device 200, a list of cryptographic schemes (e.g., cipher suites or compression methods) that are supported by the first device 200, etc. The second connection attempt message may include a protocol version that corresponds to the protocol version in the first connection attempt message and is agreed by the second device 800, a random number of the second device 800, a session ID of the second device 800, a cryptographic scheme that is included in the list of cryptographic schemes in the first connection attempt message and is selected by the second device 800, etc. In addition, each of the first and second connection attempt messages may include an IP address, a port number, etc. that are included in the session information SINF.

After the first and second connection attempt messages are exchanged, the processor that operates in the secure mode may exchange first key information and second key information with the second device 800. For example, each of the second device 800 and the processor may generate a private key. The second device 800 and the processor may generate the first key information and second key information, respectively, based on its own private key and the random number in each of the first and second connection attempt messages. The second device 800 may transmit a "Server_Key_Exchange" message including the first key information to the processor (S122), and the processor may transmit a "Client_Key_Exchange" message including the second key information to the second device 800 (S134). For example, the second key information may be referred to as a pre-master key.

In some embodiments, the private key, the first key information and/or the second key information may be generated based on one of various cryptographic algorithms, such as Diffie-Hellman (DH) algorithm; data encryption standard (DES) algorithm; Rivest, Shamir & Adelman (RSA) algorithm; SHA (secure hash algorithm), etc.

In some embodiments, if the "Server_Key_Exchange" message is omitted, the first key information may be included in a "Server_Certificate" message that represents a certificate of the second device 800. In other embodiments, if both the "Server_Key_Exchange" message and the "Server_Certificate" message are omitted, the first key information may be included in the "Server_Hello" message that represents the second connection attempt message.

In some embodiments, after operation S122 and before operation S134, the second device 800 may selectively transmit a "Certificate_Request" message for requesting a certificate of the first device 200 to the processor (S124), the second device 800 may transmit a "Server_Hello_Done" that represents all messages are successfully transmitted to the processor (S126), or the processor may selectively transmit a "Client_Certificate" message that represents the certificate of the first device 200 to the second device 800 in response to the "Certificate_Request" message (S132). In some embodiments, after operation S134, the processor may selectively transmit a "Certificate_Verify" message that corresponds to the "Client_Certificate" message to the second device 800 (S136).

After the first key information and the second key information are exchanged, each of the processor that operates in the secure mode and the second device 800 may generate the master key MKEY based on the first key information and the second key information (S142 and S144). For example, each of the processor and the second device 800 may generate the master key MKEY based on the pre-master key.

After the master key MKEY is generated, the processor that operates in the secure mode may exchange a first connection completion message and a second connection completion message with the second device 800. For example, the processor may transmit the first connection completion message to the second device 800 (S152), and the second device 800 may transmit the second connection completion message to the processor in response to the first connection completion message (S154). For example, a "Client_Finished" message illustrated in FIG. 6 may represent the first connection completion message, and a "Server_Finished" message illustrated in FIG. 6 may represent the second connection completion message.

As a result, in the secure mode, the handshaking operation may be performed in safety between the first device 200 and the second device 800 (e.g., between the processor that operates in the secure mode and the second device 800), and thus the first security session SS1 may be formed in safety based on the handshaking operation. The session information SINF and the master key MKEY may be generated as a result of forming the first security session SS1. For example, the session information SINF may include an IP address, a port number, a certificate, or the like. The certificate included in the session information SINF may be the certificate of the first device 200.

Although not illustrated in FIG. 17, before operation S152, the processor may transmit a "Client_Change_Cipher_Spec" message to the second device 800. Before operation S154, the second device 800 may transmit a "Server_Change_Cipher_Spec" message to the processor.

Figure 18:
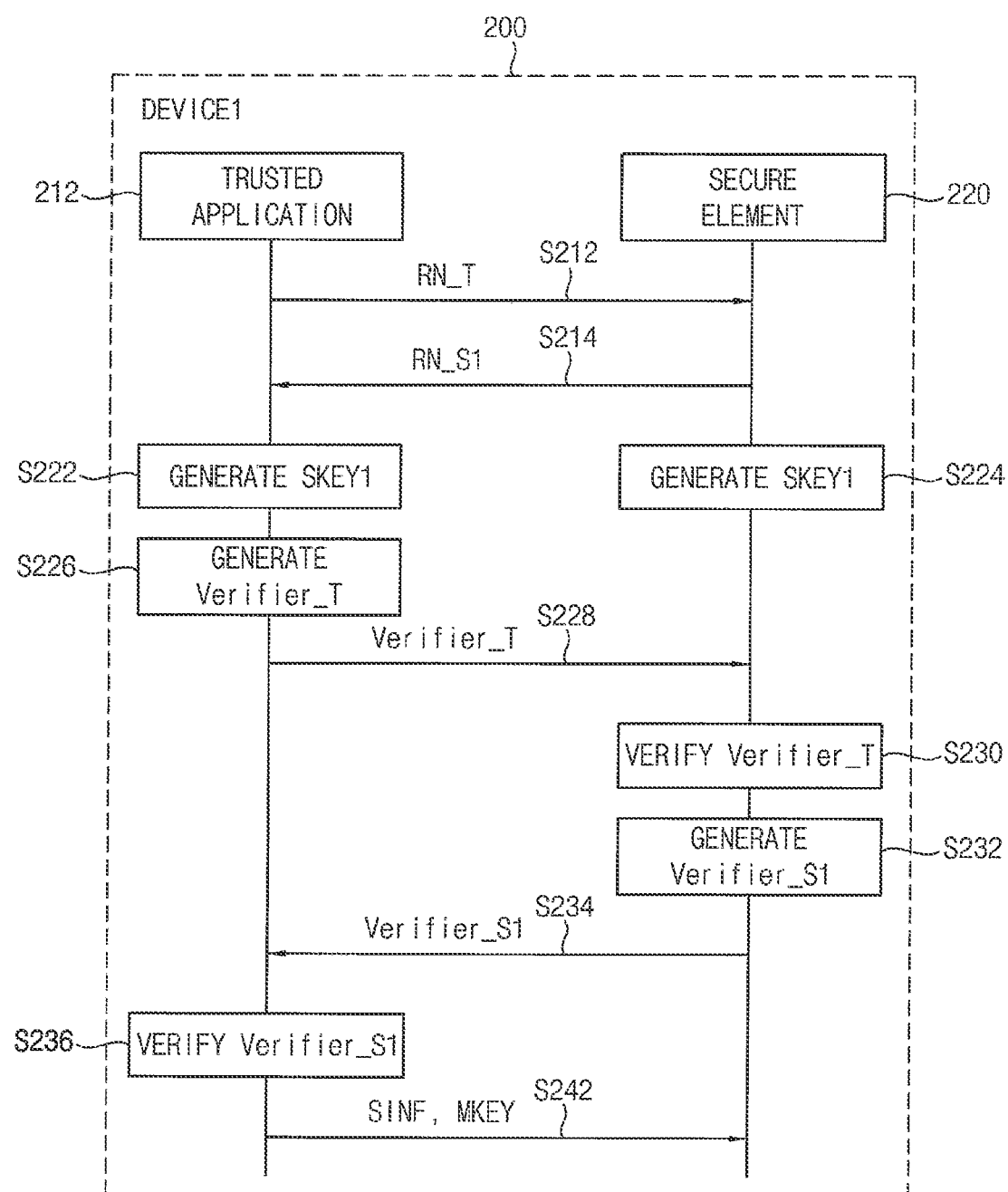

FIG. 18 is a conceptual diagram illustrating in one example the storing of session information and master key in a secure element (e.g., S200 in FIG. 16).

Referring to FIGS. 16 and 18, to store the session information SINF and the master key MKEY that are generated by forming the first security session SS1 into the secure element 220 (e.g., S200), the processor (e.g., the processor 110 in FIG. 14) that is included in the first device 200 and operates in the secure mode may exchange a first random number RN_T and a second random number RN_S1 with the secure element 220. For example, the processor may transmit the first random number RN_T to the secure element 220 (S212), and the secure element 220 may transmit the second random number RN_S1 to the processor (S214). The first random number RN_T may be generated by the processor, and the second random number RN_S1 may be generated by the secure element 220.

After the first and second random numbers RN_T and RN_S1 are exchanged, the processor that operates in the secure mode and the secure element 220 may perform a verification operation based on the first random number RN_T, the second random number RN_S1 and a pre-shared key PSK.

To perform the verification operation, each of the processor and the secure element 220 may generate a session key SKEY1 based on the first random number RN_T, the second random number RN_S1 and the pre-shared key PSK (S222 and S224). For example, the session key SKEY1 may satisfy Equation 1.

$$SKEY1=SHA\text{-}256\ (RN\_T|RN\_S1|PSK) \quad\quad \text{[Equation 1]}$$

In some embodiments, the processor may generate the session key SKEY1 using the pre-shared key PSK that is pre-stored in the pre-stored region 201a in FIG. 15, and the secure element 220 may generate the session key SKEY1 using the pre-shared key PSK that is pre-stored in the pre-stored region 226 in FIG. 15.

The processor may generate a first verifier Verifier_T based on the session key SKEY1 (operation S226), and may transmit the first verifier Verifier_T to the secure element 220 (operation S228). For example, the first verifier Verifier_T may satisfy Equation 2.

$$Verifier\_T=SHA\text{-}256\ (RN\_T|RN\_S1|SKEY1) \quad\quad \text{[Equation 2]}$$

The secure element 220 may verify the first verifier Verifier_T (S230). When a verification for the first verifier Verifier_T is successfully completed, the secure element 220 may generate a second verifier Verifier_S1 based on the session key SKEY1 and the first verifier Verifier_T (S232), and may transmit the second verifier Verifier_S1 to the processor (S234). For example, the second verifier Verifier_S1 may satisfy Equation 3.

$$Verifier\_S1=SHA\text{-}256\ (RN\_T|RN\_S1|SKEY1|Verifier\_T) \quad\quad \text{[Equation 3]}$$

The processor may verify the second verifier Verifier_S1 (S236).

When the verification operation is successfully completed, e.g., when both the verification for the first verifier Verifier_T in operation S230 and a verification for the second verifier Verifier_S1 in operation S236 are successfully completed, the processor that operates in the secure mode may transmit the session information SINF and the master key MKEY to the secure element 220 (S242). Accordingly, the session information SINF and the master key MKEY that are generated in the secure mode may be stored into the secure element 220 in safety.

In some embodiments, operations S224, S230 and S232 may be performed by the processing unit 222 in FIG. 15 that is included in the secure element 220, and the session information SINF and the master key MKEY may be stored into the storage 224 in FIG. 15 that is included in the secure element 220.

Although an example where the session key SKEY1, the first verifier Verifier_T and the second verifier Verifier_S1 are generated based on SHA-256 algorithm is described with reference to Equations 1, 2 and 3, the session key and/or the verifiers may be generated based on one of various cryptographic algorithms according to embodiments.

Figure 19:
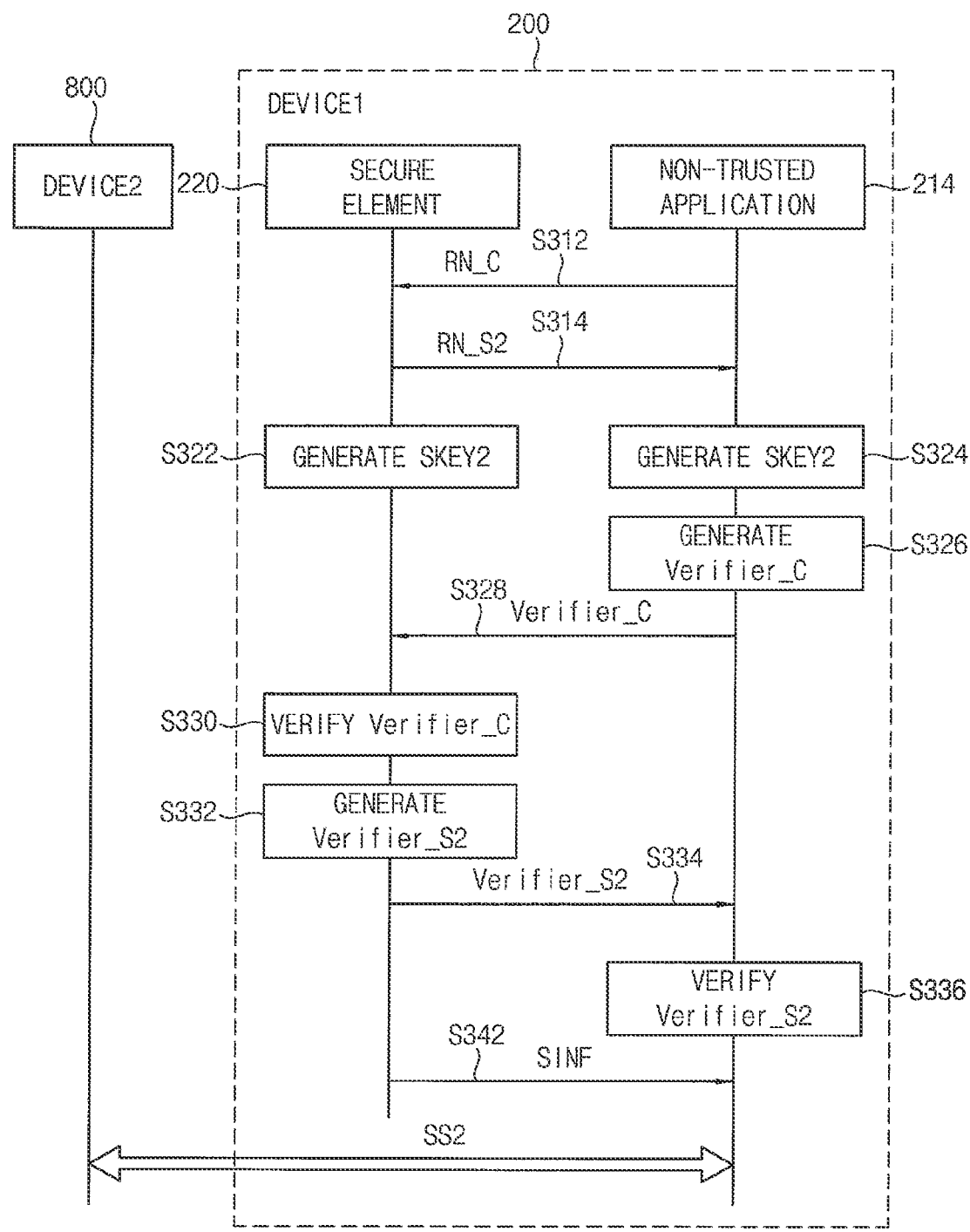

FIG. 19 is a conceptual diagram illustrating in one example the forming of a second security session like the one described in relation to FIG. 5.

Referring to FIGS. 5, 16 and 19, in order to form the second security session SS2 (e.g., S300), the processor (e.g., the processor 110 in FIG. 14) included in the first device 200 and operating in the normal mode may exchange a third random number RN_C and a fourth random number RN_S2 with the secure element 220. For example, the processor may transmit the third random number RN_C to the secure element 220 (S312), and the secure element 220 may transmit the fourth random number RN_S2 to the processor (S314). The third random number RN_C may be generated by the processor, and the fourth random number RN_S2 may be generated by the secure element 220. Here, operations S312 and S314 in FIG. 19 may be substantially similar to the operations S212 and S214 described in relation to FIG. 18, respectively.

After the third and fourth random numbers RN_C and RN_S2 are exchanged, the processor that operates in the normal mode and the secure element 220 may perform a verification operation based on the third random number RN_C, the fourth random number RN_S2 and the pre-shared key PSK.

To perform the verification operation, each of the processor and the secure element 220 may generate a session key SKEY2 based on the third random number RN_C, the fourth random number RN_S2 and the pre-shared key PSK (S322 and S324). In some embodiments, the processor may generate the session key SKEY2 using the pre-shared key PSK that is pre-stored in the pre-stored region 201b in FIG. 15, and the secure element 220 may generate the session key SKEY2 using the pre-shared key PSK that is pre-stored in the pre-stored region 226 in FIG. 15. The processor may generate a third verifier Verifier_C based on the session key SKEY2 (S326), and may transmit the third verifier Verifier_C to the secure element 220 (S328). The secure element 220 may verify the third verifier Verifier_C (S330). When a verification for the third verifier Verifier_C is successfully completed, the secure element 220 may generate a fourth verifier Verifier_S2 based on the session key SKEY2 and the third verifier Verifier_C (S332), and may transmit the fourth verifier Verifier_S2 to the processor (S334). The processor may verify the fourth verifier Verifier_S2 (S336). As with Equations 1, 2 and 3, the session key SKEY2, the third verifier Verifier_C and the fourth verifier Verifier_S2 may satisfy Equation 4, Equation 5 and Equation 6, respectively.

$$SKEY2=SHA\text{-}256\ (RN\_C|RN\_S2|PSK) \quad \text{[Equation 4]}$$

$$Verifier\_C=SHA\text{-}256\ (RN\_C|RN\_S2|SKEY2) \quad \text{[Equation 5]}$$

$$Verifier\_S2=SHA\text{-}256 \\ (RN\_C|RN\_S2|SKEY2|Verifier\_C) \quad \text{[Equation 6]}$$

When the verification operation is successfully completed, e.g., when both the verification for the third verifier Verifier_C in operation S330 and a verification for the fourth verifier Verifier_S2 in operation S336 are successfully completed, the processor that operates in the normal mode may load the session information SINF from the secure element 220 (S342).

As a result, in the normal mode, the handshaking operation may not be performed, and then the second security session SS2 may be formed between the first device 200 and the second device 800 (e.g., between the processor that operates in the normal mode and the second device 800) based on the session information SINF loaded from the secure element 220 and without the handshaking operation. While the second security session SS2 is formed, the master key MKEY stored in the secure element 220 may not be exposed, leaked or drained.

Figure 20:
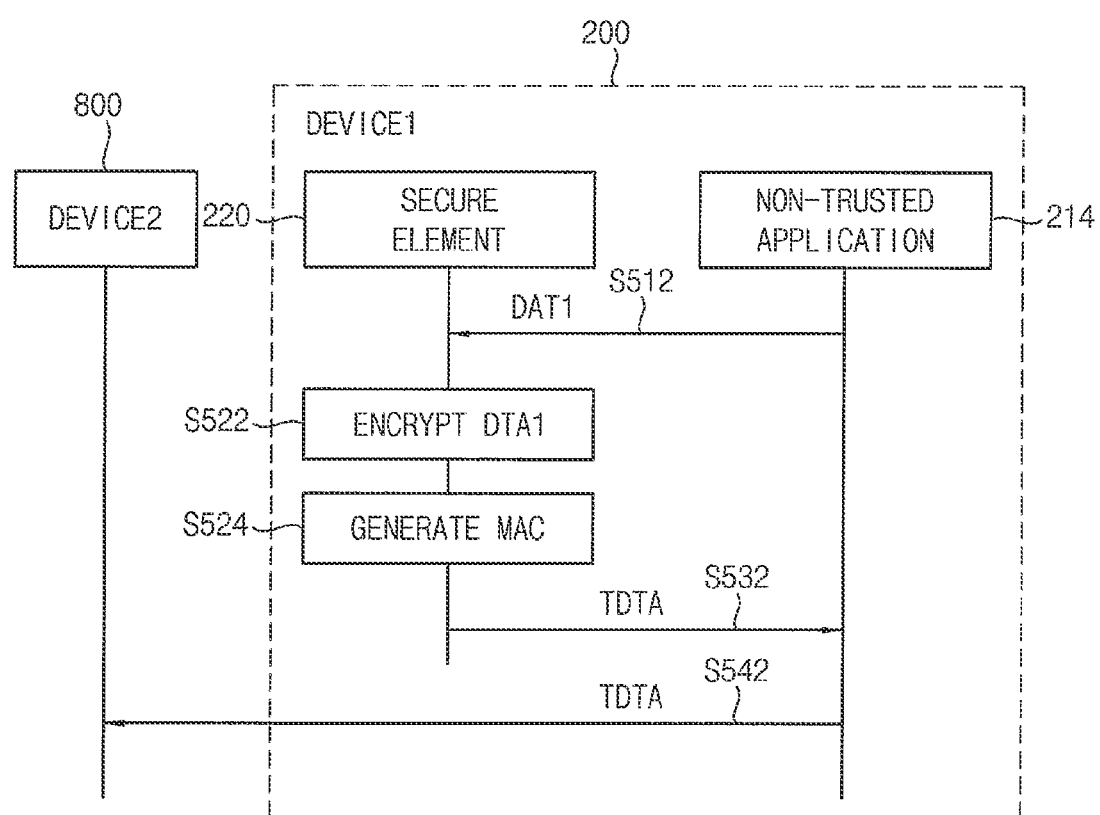
Figure 21:
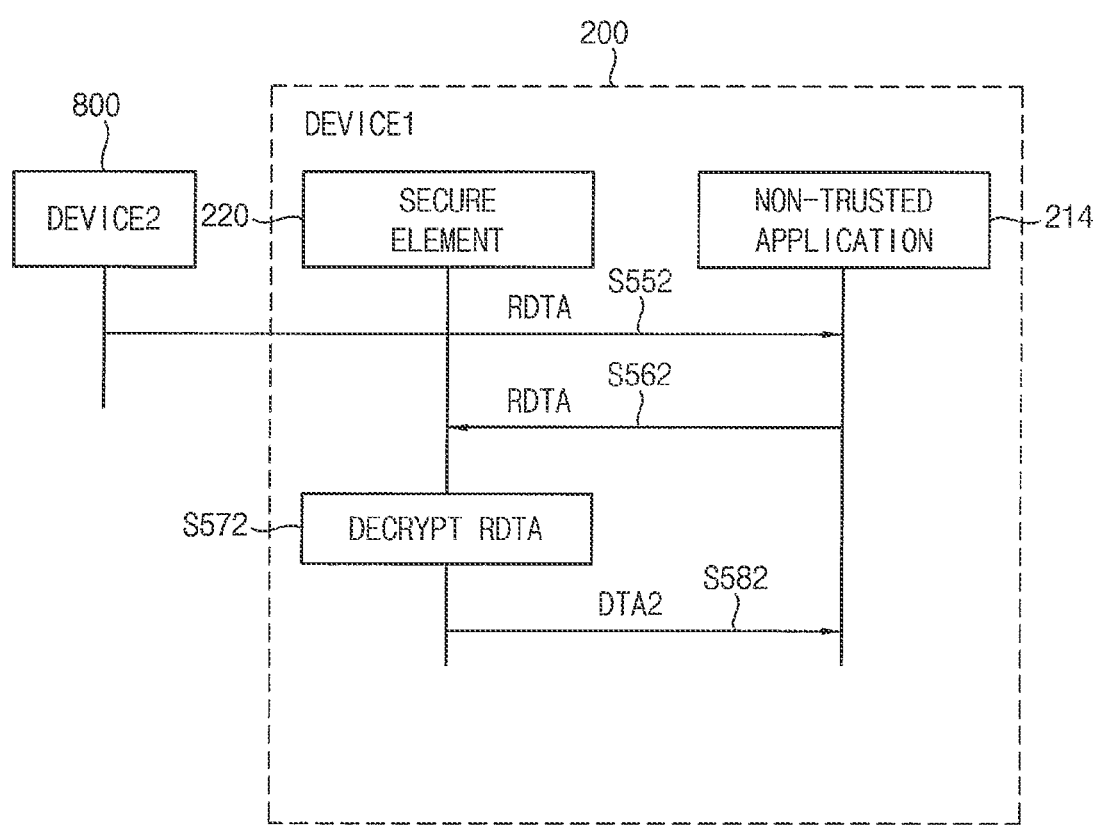

FIGS. 20 and 21 are respective conceptual diagrams further illustrating examples of the exchanging of encoded data as described in relation to FIG. 16.

Referring to FIGS. 16 and 20, to order to transmit the encrypted data to the second device 800 through the second security session SS2 (e.g., S500), the processor (e.g., the processor 110 in FIG. 4) included in the first device 200 and operating in the normal mode may transmit the encrypted data to the second device 800 using the secure element 220.

Since the master key MKEY is only stored in the secure element 220, and since the processor that operates in the normal mode does not know the master key MKEY, the processor that operates in the normal mode may transmit first data DTA1 that is to be transmitted to the second device 800 to the secure element 220 (S512). The first data DTA1 may be encrypted data that is autonomously encrypted internally in the memory 300.

After the first data DTA1 is transmitted to the secure element 220, the secure element 220 may generate second data TDTA by encrypting the first data DTA1 based on the master key MKEY. For example, the secure element 220 may compress the first data DTA1 based on the master key MKEY (S522), and may generate a message authentication code MAC based on the master key MKEY (S524). The secure element 220 may combine the compressed first data with the message authentication code MAC and may encrypt the combined data to obtain the second data TDTA.

In some embodiments, a first portion of the master key MKEY may be used for compressing the first data DTA1, and a second portion of the master key MKEY may be used for generating the message authentication code MAC. For example, the master key MKEY may be represented as a combination of a plurality of bits. A half of the plurality of bits (e.g., least significant bits (LSBs)) included in the master key MKEY may correspond to the first portion of the master key MKEY, and another half of the plurality of bits (e.g., most significant bits (MSBs)) included in the master key MKEY may correspond to the second portion of the master key MKEY.

After the second data TDTA is generated, the secure element 220 may transmit the second data TDTA to the processor that operates in the normal mode (S532), and the processor that operates in the normal mode may transmit the second data TDTA to the second device 800 through the second security session SS2 (S542).

Accordingly, the first data DTA1 may be encoded in safety using the secure element 220, without exposing or leaking the master key MKEY, and then the encrypted data (e.g., the second data TDAT) may be transmitted to the second device 800 in safety.

Referring to FIGS. 16 and 21, in order to transmit the encrypted data to the second device 800 through the second security session SS2 (e.g., S500), the processor (e.g., the processor 110 in FIG. 14) included in the first device 200 and operating in the normal mode may receive the encoded data from the second device 800.

The second device 800 may transmit third data RDTA to the processor that operates in the normal mode through the second security session SS2 (S552).

After the third data RDTA is received, the processor that operates in the normal mode may transmit the third data RDTA to the secure element 220 (S562), because the master key MKEY is only stored in the secure element 220, and because the processor that operates in the normal mode does not know the master key MKEY.

After the third data RDAT is transmitted to the secure element 220, the secure element 220 may generate fourth data DTA2 by decrypting the third data RDTA based on the master key MKEY (S572). A decryption operation in operation S452 may correspond to a reverse operation of the encryption operation described with reference to operations S522 and S524 in FIG. 20. For example, the secure element 220 may decrypt the third data RDTA, may divide the decrypted third data into compressed data and the message authentication code MAC, and may decompress the compressed data to obtain the fourth data DTA2.

After the fourth data DTA2 is generated, the secure element 220 may transmit the fourth data DTA2 to the processor that operates in the normal mode (S582).

Accordingly, the third data RDTA that is received from the second device 800 may be decrypted in safety using the secure element 220, without exposing or leaking the master key MKEY, and then the decrypted data (e.g., the fourth data DTA2) may be obtained in safety.

Figure 22:
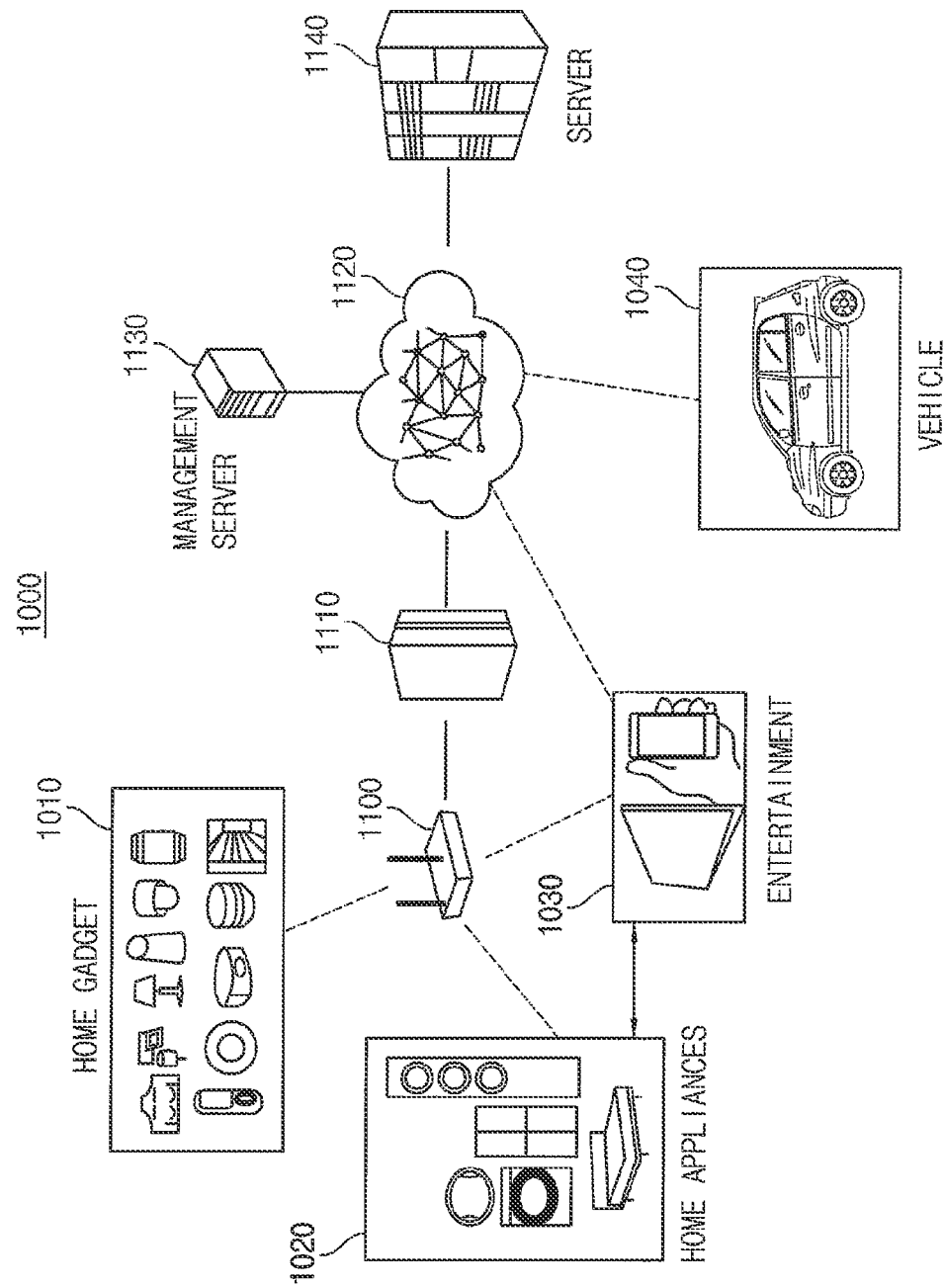
FIG. 22 is a conceptual diagram illustrating an IoT network system capable of implementing a method of performing secure communication according to embodiments of the inventive concept.

FIG. 22 is a conceptual diagram illustrating an IoT network system capable of implementing a method of performing secure communication according to embodiments of the inventive concept.

Referring to FIG. 22, an IoT network system 1000 includes a plurality of IoT devices 1010, 1020, 1030 and 1040, a hub 1100, a gateway 1110, a communication network 1120, a management server 1130 and a server 1140.

The plurality of IoT devices 1010, 1020, 1030 and 1040 may include a home gadget group 1010, a home appliances/furniture group 1020, an entertainment group 1030 and a vehicle group 1040. The plurality of IoT devices 1010, 1020, 1030 and 1040 may communicate with the management server 1130 and/or the server 1140 via at least one of the hub 1100, the gateway 1110 and the communication network 1120. The management server 1130 and the server 1140 may control and/or analyze the plurality of IoT devices 1010, 1020, 1030 and 1040, the hub 1100, the gateway 1110 and the communication network 1120.

In some embodiments, one of the IoT devices 1010, 1020, 1030 and 1040 may correspond to the first device described with reference to FIGS. 13 through 21, and the hub 1100 may correspond to the second device described with reference to FIGS. 13 through 21. In other embodiments, one of the IoT devices 1010, 1020, 1030 and 1040, the hub 1100 and the gateway 1110 may correspond to the first device described with reference to FIGS. 13 through 21, and one of the management server 1130 and the server 1140 may correspond to the second device described with reference to FIGS. 13 through 21

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims.

What is claimed is:

1. A method of encrypting data in a nonvolatile memory device (NVM) including a memory cell array of memory cells respectively configured to store at least one data bit, the method comprising:
    programming data in selected memory cells among the memory cells;
    sensing the selected memory cells at a first time during a develop period to provide random data, and sensing the selected memory cells at a second time during the develop period to provide main data;
    encrypting the main data using the random data to generate encrypted main data; and
    outputting the encrypted main data to an external circuit,
    wherein randomness of the random data is based on a threshold voltage distribution of the selected memory cells.

2. The method of claim 1, the NVM further including a page buffer circuit, the memory cell array including wordlines and bitline, and the sensing of the selected memory cells at the first time during the develop period to provide the random data, and the sensing of the selected memory cells at the second time during the develop period to provide the main data comprises:
    performing double sampling using the page buffer circuit and the bitlines on the selected memory cells while a first read voltage is applied to a selected wordline among the wordlines coupled to the selected memory cells.

3. The method of claim 1, wherein the encrypting of the main data using the random data is performed without using a separate random number generator.

4. The method of claim 1, wherein the first time precedes the second time during the develop period.

5. The method of claim 4, wherein the second time is closer to an end of the develop period than a beginning time of the develop period.

6. The method of claim 1, wherein the NVM further includes an encryption circuit and the encrypting of the main data using the random data to generate the encrypted main data comprises:
    using the encryption circuit to perform a logical operation on the main data and the random data.

7. The method of claim 6, wherein the logical operation is an exclusive OR operation.

8. The method of claim 6, wherein the logical operation is an exclusive NOR operation.

9. The method of claim 6, wherein the NVM further includes an address decoder coupled to the memory cell array through wordlines, and the method further comprises:
    applying a first read voltage to a selected wordline among the wordlines while sensing the selected memory cells at the first time during the develop period to provide the random data, and sensing the selected memory cells at the second time during the develop period to provide the main data.

10. The method of claim 6, wherein each of the memory cells is configured to store a plurality of data bits using a plurality of threshold voltage distributions.

11. The method of claim 6, wherein the NVM further includes a page buffer circuit,
    the sensing of the selected memory cells at the first time during the develop period to provide the random data includes storing the random data in the page buffer circuit, and
    the sensing of the selected memory cells at the second time during the develop period to provide the main data includes storing the main data in the page buffer circuit.

12. The method of claim 11, wherein the page buffer circuit includes a first data latch and a second data latch,
    the random data being stored in the first data latch, and
    the main data being stored in the second data latch.

13. A nonvolatile memory device (NVM) comprising:
    a memory cell array including pages and each of the pages including memory cells respectively configured to store at least one data bit;
    a page buffer circuit coupled to the memory cell array through bitlines, the page buffer circuit including page buffers respectively configured to sense memory cells in a selected page among the pages at a first time and at a second time during a develop period through the bitlines to provide random data and main data, respectively;
    an encryption circuit connected to the page buffer circuit and configured to encrypt the main data using the random data to generate encrypted main data;
    a data input/output (I/O) circuit connected to the encryption circuit and configured to output the encrypted main data to an external circuit; and
    a control circuit configured to control the page buffer circuit, the encryption circuit and the data I/O circuit,
    wherein the randomness of the random data is based on a threshold voltage distribution of the selected memory cells.

14. The NVM of claim 13, wherein the control circuit is configured to control the page buffer circuit to perform double sampling on the selected memory cells through the bitlines while a first read voltage is applied to a selected wordline coupled to the selected page.

15. The NVM of claim 13, wherein the encryption circuit is configured to perform a logical operation on the main data and the random data.

16. The NVM of claim 15, wherein the encryption circuit includes a plurality of exclusive OR gates configured to perform an exclusive OR operation between the main data and the random data.

17. The NVM of claim 13, wherein the page buffer circuit includes a plurality of page buffers, each page buffer including:
- a pre-charge circuit including a first P-channel metal-oxide semiconductor (PMOS) transistor and a second PMOS transistor connected in series between a pre-charge voltage source and a sensing node;
- a switch circuit coupled between a respective bitline among the bitlines and the sensing node; and
- a sense and latch circuit coupled between the sensing node and a ground voltage, the sense and latch circuit including,
  - a latch
  - a first N-channel metal-oxide semiconductor (NMOS) transistor,
  - a second NMOS transistor connected in series with the first NMOS transistor between a first node of the latch and the ground voltage,
  - a third NMOS transistor, and
  - a fourth NMOS transistor connected in series with the third NMOS transistor between a second node of the latch and the ground voltage, a gate of the fourth NMOS transistor being connected to the sensing node,
  - wherein the control circuit is configured to apply a sensing enable signal to the third NMOS transistor to perform a first sensing and a second sensing.

18. The NVM of claim 13, wherein the memory cell array includes:
- first memory cells coupled to a first wordline, the first memory cells corresponding to the selected memory cells; and
- second memory cells coupled to a second wordline, the second memory cells being stacked on the first memory cells.

19. A user device comprising:
- a secure element configured to store secure data;
- a memory configured to store user data; and
- a processor connected to the secure element and the memory through a bus,
- wherein the processor is configured to:
- form a first security session between the user device and an external device while the user device operates in a secure mode, the first security session being formed by performing a handshaking operation between the user device and the external device;
- form a second security session between the user device and the external device while the user device operates in a normal mode, the second security session being formed without performing the handshaking operation and by loading the session information stored in the secure element; and
- provide encrypted data from the memory through the second security session based on the master key stored in the secure element,
- wherein the memory is configured to encrypt the user data using a physical characteristic of memory cells storing the user data.

20. The user device of claim 19, wherein the memory is a nonvolatile memory device comprising:
- a memory cell array including pages, each of the pages including memory cells, and each of the memory cells configured to store at least one data bit;
- a page buffer circuit coupled to the memory cell array through bitlines, the page buffer circuit including page buffers respectively configured to sense memory cells in a selected page from among the pages at a first time and at a second time during a develop period through the bitlines to provide random data and main data, respectively;
- an encryption circuit connected to the page buffer circuit and configured to encrypt the main data using the random data to generate encrypted main data;
- a data input/output (I/O) circuit connected to the encryption circuit and configured to output the encrypted main data to an outside of the NVM; and
- a control circuit configured to control the page buffer circuit, the encryption circuit and the data I/O circuit,
- wherein randomness of the random data is based on a threshold voltage distribution of the selected memory cells.

* * * * *